US012810471B2

(12) United States Patent
Myokan

(10) Patent No.: US 12,810,471 B2
(45) Date of Patent: Nov. 24, 2026

(54) CAMERA CALIBRATION APPARATUS, CAMERA CALIBRATION METHOD, AND RECORDING MEDIUM

(71) Applicant: Sony Group Corporation, Tokyo (JP)

(72) Inventor: Yoshihiro Myokan, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 109 days.

(21) Appl. No.: 18/994,624

(22) PCT Filed: Aug. 7, 2023

(86) PCT No.: PCT/JP2023/028737
§ 371 (c)(1),
(2) Date: Jan. 15, 2025

(87) PCT Pub. No.: WO2024/043055
PCT Pub. Date: Feb. 29, 2024

(65) Prior Publication Data
US 2026/0260381 A1 Sep. 3, 2026

(30) Foreign Application Priority Data
Aug. 24, 2022 (JP) ................................ 2022-133003

(51) Int. Cl.
*G06T 7/80* (2017.01)
*H04N 17/00* (2006.01)

(52) U.S. Cl.
CPC ............. *G06T 7/80* (2017.01); *H04N 17/002* (2013.01); *G06T 2207/10048* (2013.01); *G06T 2207/30204* (2013.01)

(58) Field of Classification Search
CPC ............. G06T 7/80; G06T 2207/10048; G06T 2207/30204; H04N 17/002
See application file for complete search history.

(56) References Cited

U.S. PATENT DOCUMENTS

2020/0177866 A1* 6/2020 Myokan .................... G06T 7/80
2020/0226789 A1* 7/2020 Ma ............................ G06T 5/80
(Continued)

FOREIGN PATENT DOCUMENTS

JP 2009-069135 A 4/2009
JP 2019-161278 A 9/2019
(Continued)

OTHER PUBLICATIONS

Harris et al., A Combined Corner and Edge Detector, Alvey Vision Conference, 1988, pp. 147-152.
(Continued)

*Primary Examiner* — Michael E Teitelbaum
(74) *Attorney, Agent, or Firm* — Paratus Law Group, PLLC

(57) ABSTRACT

The present disclosure relates to a camera calibration apparatus, a camera calibration method, and a recording medium that allow calibration with higher accuracy to be performed reliably. There is provided a camera calibration apparatus that includes: an image acquisition unit that acquires, from a camera, a captured image indicating a chart pattern displayed in a time division manner on a display panel inclined with respect to an optical axis direction of the camera; a feature-point-information generation unit that generates integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and a parameter acquisition unit that acquires a parameter for calibration of
(Continued)

the camera on the basis of the integrated feature point information.

11 Claims, 26 Drawing Sheets

(56) References Cited

U.S. PATENT DOCUMENTS

| | | | | |
|---|---|---|---|---|
| 2022/0358679 | A1* | 11/2022 | Chen | G06T 7/73 |
| 2022/0408067 | A1* | 12/2022 | Tsai | G06V 10/245 |

FOREIGN PATENT DOCUMENTS

| | | | |
|---|---|---|---|
| JP | 6764533 | B2 | 9/2020 |
| WO | WO 2018/235163 | A1 | 12/2018 |

OTHER PUBLICATIONS

Garrido-Jurado et al., Automatic generation and detection of highly reliable fiducial markers under occlusion, Pattern Recognition, 2014, pp. 2280-2292, vol. 47.

Strobl et al., More Accurate Pinhole Camera Calibration with Imperfect Planar Target, ICCV Workshops, Feb. 2011, pp. 1068-1075.

Zhang, A Flexible New Technique for Camera Calibration, IEEE Transactions on pattern analysis and machine intelligence, Nov. 22, 2000, pp. 1-21.

Zhang, A Flexible New Technique for Camera Calibration, Microsoft Research Technical Report, MSR-TR-98-71, Dec. 2, 1998, pp. 1-21.

* cited by examiner

[FIG. 1]

| marker_id | plane_id | | |
|---|---|---|---|
| | panel_id | frame_ group_id | |
| 0 | 1 | 0 | t=0 |
| 1 | 2 | 0 | |
| 2 | 1 | 0 | t=1 |
| 3 | 2 | 0 | |
| 4 | 1 | 0 | t=2 |
| 5 | 2 | 0 | |
| 6 | 1 | 0 | t=3 |
| 7 | 2 | 0 | |
| 8 | 1 | 0 | t=4 |
| 9 | 2 | 0 | |
| 10 | 1 | 1 | t=5 |
| 11 | 2 | 1 | |
| • • • • | • • • • | 1 | |

FIG.7

| i | j | X | Y | Z |
|---|---|---|---|---|
| 0 | -3 | $x_0$ | $y_0$ | 0 |
| 0 | -2 | $x_1$ | $y_1$ | 0 |
| 0 | -1 | $x_2$ | $y_2$ | 0 |
| 0 | 0 | $x_3$ | $y_3$ | 0 |
| 0 | 1 | $x_4$ | $y_4$ | 0 |
| 0 | 2 | $x_5$ | $y_5$ | 0 |
| 0 | 3 | $x_6$ | $y_6$ | 0 |
| 0 | 4 | $x_7$ | $y_7$ | 0 |
| 0 | 5 | $x_8$ | $y_8$ | 0 |
| 0 | 6 | $x_9$ | $y_9$ | 0 |
| 0 | 7 | $x_{10}$ | $y_{10}$ | 0 |
| 0 | 8 | $x_{11}$ | $y_{11}$ | 0 |
| 0 | 9 | $x_{12}$ | $y_{12}$ | 0 |
| 0 | 10 | $x_{13}$ | $y_{13}$ | 0 |
| 0 | 11 | $x_{14}$ | $y_{14}$ | 0 |
| 0 | 12 | $x_{15}$ | $y_{15}$ | 0 |
| 0 | 13 | $x_{16}$ | $y_{16}$ | 0 |
| 0 | 14 | $x_{17}$ | $y_{17}$ | 0 |
| 0 | 15 | $x_{18}$ | $y_{18}$ | 0 |
| 1 | -9 | $x_{19}$ | $y_{19}$ | 0 |
| ... | ... | ... | ... | ... |

FIG.10

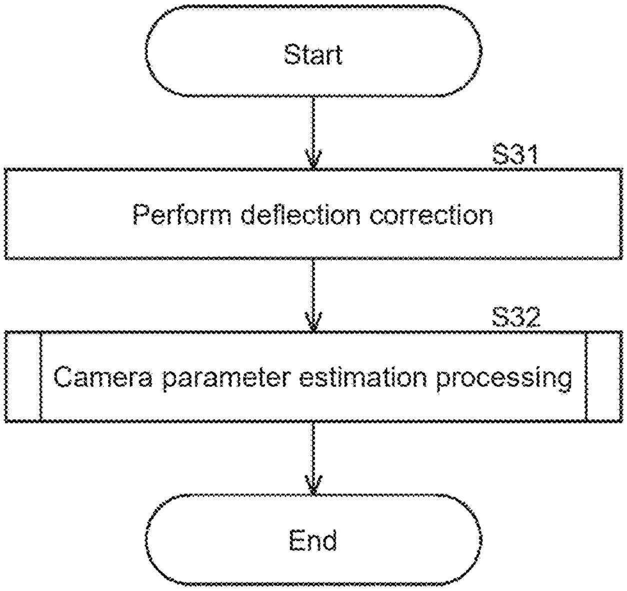

FIG.11

| $X_{org}$ | $Y_{org}$ | $\Delta X$ | $\Delta Y$ | $\Delta Z$ |
|---|---|---|---|---|
| $x_{org0}$ | $y_{org0}$ | $\Delta x_0$ | $\Delta y_0$ | $\Delta z_0$ |
| $x_{org1}$ | $y_{org1}$ | $\Delta x_1$ | $\Delta y_1$ | $\Delta z_1$ |
| $x_{org2}$ | $y_{org2}$ | $\Delta x_2$ | $\Delta y_2$ | $\Delta z_2$ |
| $x_{org3}$ | $y_{org3}$ | $\Delta x_3$ | $\Delta y_3$ | $\Delta z_3$ |
| $x_{org4}$ | $y_{org4}$ | $\Delta x_4$ | $\Delta y_4$ | $\Delta z_4$ |
| $x_{org5}$ | $y_{org5}$ | $\Delta x_5$ | $\Delta y_5$ | $\Delta z_5$ |
| $x_{org6}$ | $y_{org6}$ | $\Delta x_6$ | $\Delta y_6$ | $\Delta z_6$ |
| $x_{org7}$ | $y_{org7}$ | $\Delta x_7$ | $\Delta y_7$ | $\Delta z_7$ |
| $x_{org8}$ | $y_{org8}$ | $\Delta x_8$ | $\Delta y_8$ | $\Delta z_8$ |
| $x_{org9}$ | $y_{org9}$ | $\Delta x_9$ | $\Delta y_9$ | $\Delta z_9$ |
| $x_{org10}$ | $y_{org10}$ | $\Delta x_{10}$ | $\Delta y_{10}$ | $\Delta z_{10}$ |
| • • • | • • • | • • • | • • • | • • • |

FIG.12

| index | $X_{org}$ | $Y_{org}$ | $Z_{org}$ | $X_{new}$ | $Y_{new}$ | $X_{new}$ |
|---|---|---|---|---|---|---|
| 0 | $x_{org0}$ | $y_{org0}$ | $z_{org0}$ | $x_{new0}$ | $y_{new0}$ | $z_{new0}$ |
| 1 | $x_{org1}$ | $y_{org1}$ | $z_{org1}$ | $x_{new1}$ | $y_{new1}$ | $z_{new1}$ |
| 2 | $x_{org2}$ | $y_{org2}$ | $z_{org2}$ | $x_{new2}$ | $y_{new2}$ | $z_{new2}$ |
| 3 | $x_{org3}$ | $y_{org3}$ | $z_{org3}$ | $x_{new3}$ | $y_{new3}$ | $z_{new3}$ |
| 4 | $x_{org4}$ | $y_{org4}$ | $z_{org4}$ | $x_{new4}$ | $y_{new4}$ | $z_{new4}$ |
| 5 | $x_{org5}$ | $y_{org5}$ | $z_{org5}$ | $x_{new5}$ | $y_{new5}$ | $z_{new5}$ |
| 6 | $x_{org6}$ | $y_{org6}$ | $z_{org6}$ | $x_{new6}$ | $y_{new6}$ | $z_{new6}$ |
| 7 | $x_{org7}$ | $y_{org7}$ | $z_{org7}$ | $x_{new7}$ | $y_{new7}$ | $z_{new7}$ |
| 8 | $x_{org8}$ | $y_{org8}$ | $z_{org8}$ | $x_{new8}$ | $y_{new8}$ | $z_{new8}$ |
| 9 | $x_{org9}$ | $y_{org9}$ | $z_{org9}$ | $x_{new9}$ | $y_{new9}$ | $z_{new9}$ |
| 10 | $x_{org10}$ | $y_{org10}$ | $z_{org10}$ | $x_{new10}$ | $y_{new10}$ | $z_{new10}$ |
| • • • | • • • | • • • | • • • | • • • | • • • | • • • |

FIG.22

| $\Delta X$ | $\Delta Y$ | $\Delta Z$ |
|---|---|---|
| $\Delta x_0$ | $\Delta y_0$ | $\Delta z_0$ |
| $\Delta x_1$ | $\Delta y_1$ | $\Delta z_1$ |
| $\Delta x_2$ | $\Delta y_2$ | $\Delta z_2$ |
| $\Delta x_3$ | $\Delta y_3$ | $\Delta z_3$ |
| $\Delta x_4$ | $\Delta y_4$ | $\Delta z_4$ |
| $\Delta x_5$ | $\Delta y_5$ | $\Delta z_5$ |
| $\Delta x_6$ | $\Delta y_6$ | $\Delta z_6$ |
| $\Delta x_7$ | $\Delta y_7$ | $\Delta z_7$ |
| $\Delta x_8$ | $\Delta y_8$ | $\Delta z_8$ |
| $\Delta x_9$ | $\Delta y_9$ | $\Delta z_9$ |
| $\Delta x_{10}$ | $\Delta y_{10}$ | $\Delta z_{10}$ |
| • • • | • • • | • • • |

FIG.23

CAMERA CALIBRATION APPARATUS, CAMERA CALIBRATION METHOD, AND RECORDING MEDIUM

CROSS REFERENCE TO PRIOR APPLICATION

This application is a National Stage Patent Application of PCT International Patent Application No. PCT/JP2023/028737 (filed on Aug. 7, 2023) under 35 U.S.C. § 371, which claims priority to Japanese Patent Application No. 2022-133003 (filed on Aug. 24, 2022), which are all hereby incorporated by reference in their entirety.

TECHNICAL FIELD

The present disclosure relates to a camera calibration apparatus, a camera calibration method, and a recording medium, and particularly to a camera calibration apparatus, a camera calibration method, and a recording medium that allow calibration with higher accuracy to be performed reliably.

BACKGROUND ART

Technologies for acquiring the position and movement of a subject or a camera itself and recognizing the attribute of the subject by detecting and analyzing the image in a captured image taken by the camera have been widely introduced in systems including security cameras, in-vehicle cameras, cameras mounted on robots, and the like, as well as cameras mounted on game devices and information terminals.

In order to ensure the processing accuracy in these systems, calibration processing of acquiring information unique to devices, such as internal parameters, distortion correction coefficients, and external parameters of imaging devices, in advance is performed. A widely known calibration technology is the Zhang's method in which a flat chart of a checkered pattern is imaged from a plurality of viewpoints and parameters are optimized such that the positions of feature points on the captured image and the positions of feature points on the plane of the chart in the real space are in a correct correspondence (see, non-Patent Literature 1).

The Zhang's method requires setting up the imaging device and chart at several positions and attitudes and then repeating imaging, which has a problem such as a large workload. Further, simple calibration methods are unlikely to achieve the same level of accuracy as that in the Zhang's method. In this regard for example, the technology disclosed in Patent Literature 1 has been proposed.

Patent Literature 1 discloses a technology for performing calibrating an imaging device with a small number of steps with high accuracy by using a chart including a plurality of planes forming a predetermined angle to acquire information equivalent to that obtained by imaging one plane from different viewpoints at one time of imaging. The pattern shown on the chart is designed to obtain an orthogonal and uniform arrangement of feature points when being imaged in a state inclined to the imaging surface.

CITATION LIST

Patent Literature

Patent Literature 1: Japanese Patent No. 6764533

Non-Patent Literature

Non-Patent Literature 1: Zhengyou Zhang, "A Flexible New Technique for Camera Calibration", Microsoft Research Technical Report, MSR-TR-98-71, Dec. 2, 1998.

DISCLOSURE OF INVENTION

Technical Problem

However, the number and accuracy of feature point coordinate groups that can be obtained from a captured image obtained at one time of imaging differ depending on the resolution and angle of view of the camera. For this reason, there is a possibility that calibration with high accuracy cannot be performed.

The present disclosure has been made in view of the above-mentioned circumstances and it is an object thereof to allow calibration with higher accuracy to be performed reliably.

Solution to Problem

A camera calibration apparatus according to one aspect of the present disclosure is a camera calibration apparatus, including: an image acquisition unit that acquires, from a camera, a captured image indicating a chart pattern displayed in a time division manner on a display panel inclined with respect to an optical axis direction of the camera; a feature-point-information generation unit that generates integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and a parameter acquisition unit that acquires a parameter for calibration of the camera on the basis of the integrated feature point information.

A camera calibration method according to an aspect of the present disclosure is a camera calibration method, including: acquiring, from a camera, a captured image indicating a chart pattern displayed in a time division manner on a display panel inclined with respect to an optical axis direction of the camera; generating integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquiring a parameter for calibration of the camera on the basis of the integrated feature point information.

A recording medium according to an aspect of the present disclosure is a recording medium that records a program including instructions to cause a computer to: acquire, from a camera, a captured image indicating a chart pattern displayed in a time division manner on a display panel inclined with respect to an optical axis direction of the camera; generate integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquire a parameter for calibration of the camera on the basis of the integrated feature point information.

In a camera calibration apparatus, a camera calibration method, and a recording medium according to an aspect of the present disclosure, a captured image indicating a chart pattern displayed in a time division manner on a display panel inclined with respect to an optical axis direction of the camera is acquired from a camera; integrated feature point information is generated by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and a parameter for calibration of the camera is acquired on the basis of the integrated feature point information.

Note that a camera calibration apparatus according to an aspect of the present disclosure may be an independent apparatus or an internal block constituting a single device.

BRIEF DESCRIPTION OF DRAWINGS

FIG. 7 is a diagram showing an example of an ID correspondence table.

FIG. 10 is a diagram showing an example of a conversion table.

FIG. 11 is a flowchart describing a flow of camera calibration processing.

FIG. 12 is a diagram showing an example of deflection correction data.

FIG. 22 is a diagram showing an example of the correspondence between original object coordinates and new object coordinates.

FIG. 23 is a diagram showing an example of correction amounts.

MODE(S) FOR CARRYING OUT THE INVENTION

<External Configuration>

Figure 1:
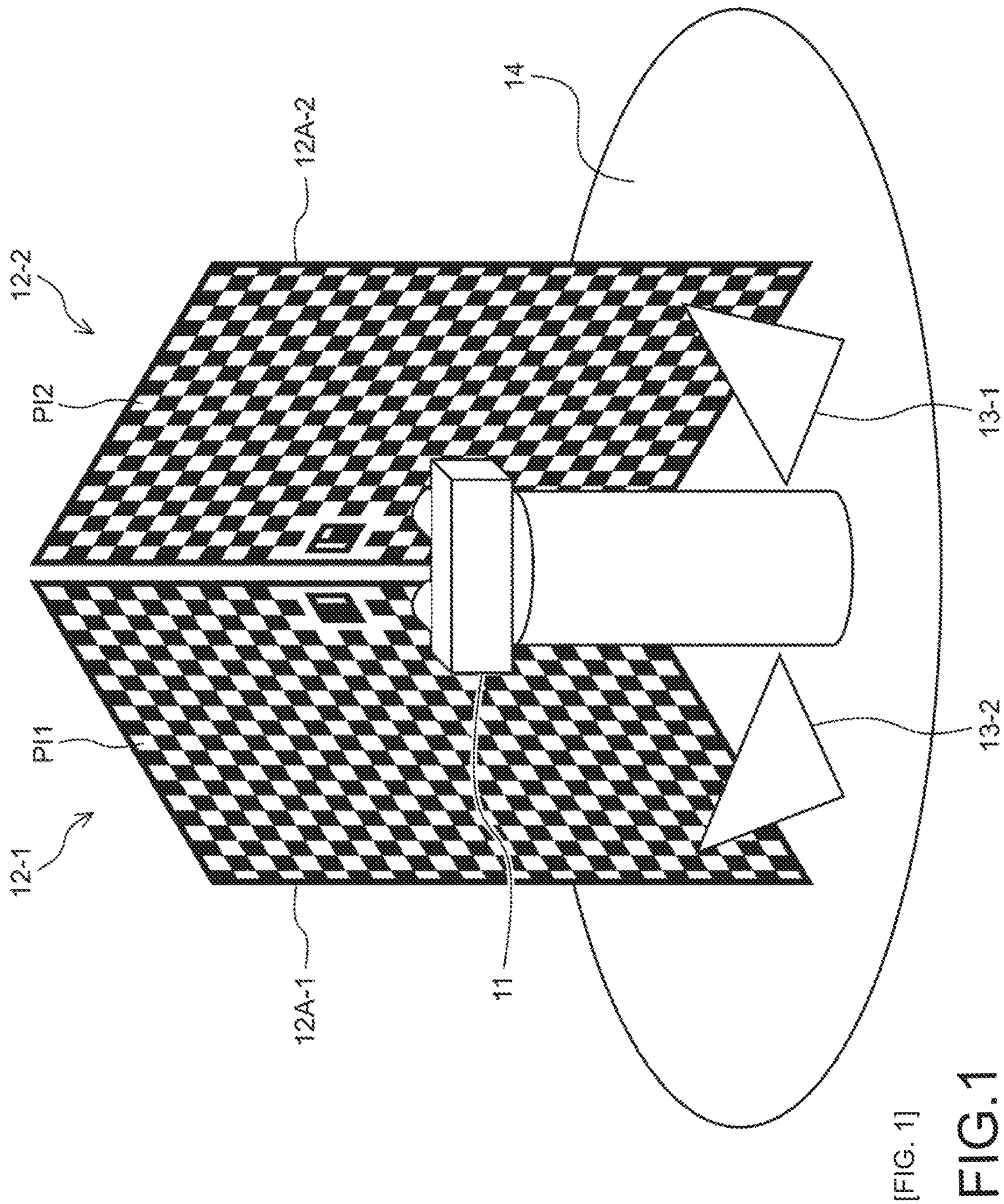
FIG. 1 is a diagram showing an example of an external configuration of a calibration system to which the present disclosure is applied.
Figure 2:
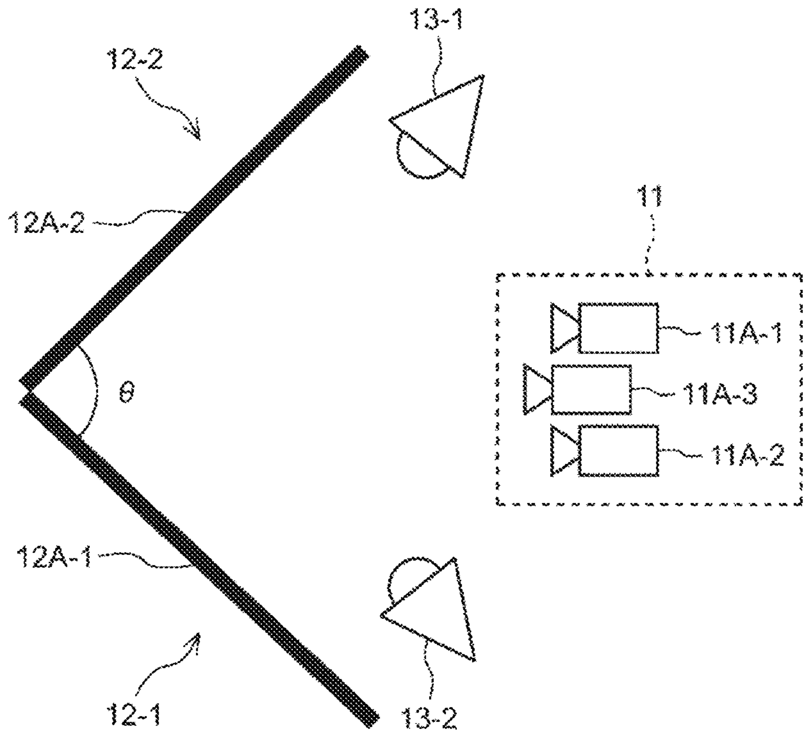
FIG. 2 is a top view of the calibration system in FIG. 1.

FIG. 1 is a diagram showing an example of an external configuration of a calibration system to which the present disclosure is applied. FIG. 2 is a top view of the calibration system in FIG. 1, and description will be made appropriately with reference thereto. The system refers to a logical collection of a plurality of devices.

In FIG. 1, the calibration system includes an imaging device 11 to be calibrated, a display device 12-1 that displays a chart pattern image PI1, a display device 12-2 that displays a chart pattern image PI2, a light source 13-1 that applies light to a display panel 12A-1 of the display device 12-1, and a light source 13-2 that apples light to a display panel 12A-2 of the display device 12-2.

The imaging device 11 includes at least one camera. For example, the camera included in the imaging device 11 can be a stereo camera in which two cameras are disposed on the right and left at a known distance. Alternatively, the imaging device 11 may include three or more cameras. What configuration the camera included in the imaging device 11 has is determined in accordance with the content of information processing performed using the imaging device 11. Hereinafter, data of the captured image will be referred to simply as a captured image in some cases.

For example, in the imaging device 11, a camera (RGB camera) that includes a visible light sensor including an image sensor such as a CMOS (Complementary Metal Oxide Semiconductor) and a CCD (Charge Coupled Device), and a signal processing circuit that performs signal processing on the image signal obtained by the visible light sensor to generate data of a captured image (RGB image) can be used.

In the imaging device 11, the camera including a visible light sensor does not necessarily need to be used, and a non-visible light camera including a non-visible light sensor for acquiring spatial information and temporal information may be used. For example, as a non-visible light camera, a ToF camera including a ToF (Time Of Flight) sensor can be used. An example of the ToF camera is a depth camera of a Direct ToF (Time Of Flight) method using a SPAD element. The ToF camera is generally configured to acquire an infrared light image (IR image) with a resolution lower than that of the RGB camera. The camera calibration in the present disclosure can be suitably executed even in the case where such an infrared light image with a low resolution is used.

For example, as shown in FIG. 2, the imaging device 11 includes cameras 11A-1 to 11A-3. The camera 11A-1 and the camera 11A-2 are each an RGB camera including a visible light sensor. The camera 11A-3 is a ToF camera including a ToF sensor. In the example of FIG. 2, the camera 11A-3 is disposed between the camera 11A-1 and the camera 11A-2, which are configured as a stereo camera.

For example, the resolution of a captured image generated by each of the camera 11A-1 and the camera 11A-2 is 1280×960. The resolution of an infrared light image generated by the camera 11A-3 is 160×120. When these images are compared with each other, the former is a high-resolution image and the latter is a low-resolution image. In this way, in the imaging device 11, the resolution of an image to be generated differs for each camera 11A in some cases. Further, the angle of view and the distortion shape of a lens differ for each camera 11A in some cases.

The display device 12-1 and the display device 12-2 are disposed to form a predetermined angle with respect to the imaging device 11. For example, as shown in FIG. 2, the display device 12-1 and the display device 12-2 are set to stand so as to form an angle θ (0°<θ<180°) with a side as the axis, the side being obtained by matching one sides of the two display panels 12A-1 and 12A-2 having the same area. The angle θ may be set to approximately 60 to 90° taking into consideration the angle of view, resolution, and the like of the camera to be calibrated. A jig 14 fixes the relative positional relationship between the imaging device 11 and the display devices 12-1 and 12-2 such that the display surfaces of the display panels 12A-1 and 12A-2 are inclined with respect to the optical axis direction of each camera 11A of the imaging device 11 and the imaging device 11 has a position and attitude with a predetermined distance from the display panels 12A-1 and 12A-2.

The display device 12-1 includes electronic paper or the like and includes the display panel 12A-1. The display panel 12A-1 displays the chart pattern image PI1 for calibration. The display device 12-2 includes electronic paper or the like and includes the display panel 12A-2. The display panel 12A-2 displays the chart pattern image PI2 for calibration. Further, in the case where the pigment of the electronic paper corresponds to the wavelength of infrared light, the combination of the electronic paper and the IR light source allows the calibration in the present disclosure to be performed on the basis of an infrared light image obtained from a ToF camera or the like.

The chart pattern image PI1 includes an image of a chart pattern such as a checkered pattern in which black and white are reversed between adjacent rectangles among the rectangles divided into a grid pattern. The chart pattern image PI2 includes an image of a chart pattern such as a checkered pattern, similarly to the chart pattern image PI1. The chart pattern included in the chart pattern image PI1 displayed on the display panel 12A-1 and the chart pattern included in the chart pattern image PI2 displayed on the display panel 12A-2 change over time.

The light source 13-1 and the light source 13-2 apply light in a wavelength band corresponding to the optical sensor included in the camera 11A. The light source 13-1 is disposed at a position where the display panel 12A-1 can be uniformly irradiated with light and no reflection occurs. The light source 13-2 is disposed at a position where the display panel 12A-2 can be uniformly irradiated with light and no reflection occurs. Note that each of the display devices 12-1 and 12-2 does not necessarily need to include electronic paper and may include an LCD (Liquid Crystal Display) or the like. The light sources 13-1 and 13-2 are disposed on accordance with the configurations of the display devices 12-1 and 12-2 and do not necessarily need to be disposed depending on the configuration.

Each camera 11A of the imaging device 11 acquires the chart pattern image PI1 displayed on the display panel 12A-1 and the chart pattern image PI2 displayed on the display panel 12A-2. The captured image is supplied to a camera calibration apparatus 22 (FIG. 3) described below and used for camera calibration processing. In the camera calibration processing, calculation for calibration is performed such that the image of a feature point in the captured image appears at a position reflecting the original position in the three-dimensional space, and camera parameters such as internal parameters and external parameters are obtained. The internal parameter includes, for example, the optical center and focal length of the camera alone, the shape of the lens distortion, and the like, and may further include a distortion correction coefficient.

The captured image that can be used for the camera calibration in the present disclosure includes not only an RGB image acquired by a visible light sensor but also a non-visible light image acquired by a non-visible light camera, more specifically, an infrared light camera. The non-visible light image may include an infrared light image (IR image) acquired by the camera 11A (ToF camera) including a ToF sensor.

<System Configuration>

Figure 3:
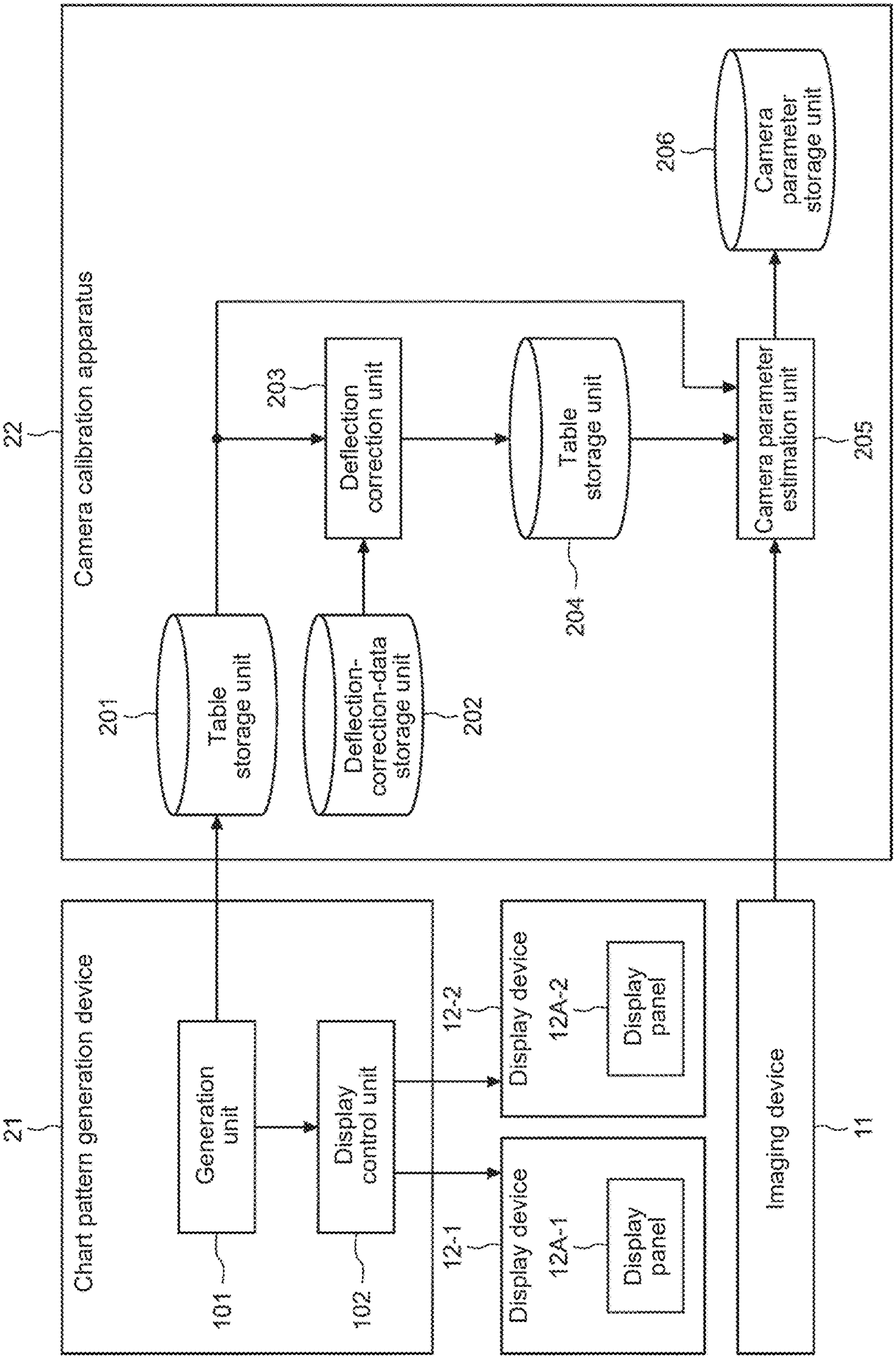
FIG. 3 is a block diagram showing a configuration example of the calibration system to which the present disclosure is applied.

FIG. 3 is a block diagram showing a configuration example of the calibration system to which the present disclosure is applied. In FIG. 3, the calibration system includes a chart pattern generation device 21 that generates a chart pattern image and various tables and the camera calibration apparatus 22 that performs calculation for calibration, in addition to the imaging device 11 and the display devices 12-1 and 12-2.

The chart pattern generation device 21 includes a PC (Personal Computer), a server, a dedicated device, or the like. The chart pattern generation device 21 is connected to the display devices 12-1 and 12-2 and the camera calibration apparatus 22 via a predetermined interface. The chart pattern generation device 21 includes a generation unit 101 and a display control unit 102.

The generation unit 101 generates a chart pattern image representing a chart pattern and supplies the generated chart pattern image to the display control unit 102. The chart pattern includes a pattern such as a checkered pattern and a marker. The display control unit 102 displays the chart pattern image supplied from the generation unit 101 on the display device 12-1 and the display device 12-2.

When generating a chart pattern image, the chart pattern image is generated on the basis of the internal parameter input thereto. The internal parameter includes information relating to each camera 11A included in the imaging device 11 to be calibrated. For example, the internal parameter includes information relating to the resolution of the captured image corresponding to the number of pixels of the optical sensor included in the camera 11A and the angle of view of the camera 11A.

The generation unit 101 generates, on the basis of the internal parameter, a chart pattern image representing a chart pattern corresponding to at least one of the resolution of the captured image corresponding to the number of pixels of the optical sensor included in each camera 11A or the angle of view of the camera 11A. In this way, a chart pattern image optimized for each camera 11A is generated. More specifically, the chart pattern image shows a pattern in which the corner interval per pixel is equal to or larger than a certain interval, and the corner interval can change over time. As a result, even when a plurality of cameras 11A in which at least one of the resolution or the angle of view differs is calibrated, each camera 11A is capable of acquiring the image of at least one chart pattern corresponding to the sub-pixel accuracy of itself. Therefore, detection of feature points (corners) by a low-resolution camera is ensured. The increase in density and accuracy of corner detection acquired by a low-resolution camera will be described below in detail. Further, by causing the internal parameter to include information relating to the distortion shape of the lens included in the camera 11A, the density of the chart pattern may be changed in accordance with the distortion shape of the lens.

The generation unit 101 generates an ID correspondence table and a conversion table in addition to a chart pattern image, and outputs them to the camera calibration apparatus 22. The ID correspondence table is a table (correspondence information) in which a marker ID, a panel ID, and a group ID are associated with each other. The marker ID is an ID for identifying the chart pattern. A marker in which a marker ID is embedded is added to the chart pattern represented by the chart pattern image. The panel ID is an ID for identifying the display panel 12A. The group ID is an ID for identifying the group corresponding to the position/attitude relationship indicating at least one of the relative position or the relative attitude between the camera 11A and (chart pattern displayed on) the display panel 12A (hereinafter, referred to as a position/attitude relationship).

The conversion table is a table (conversion information) for converting a two-dimensional index representing the positional relationship of feature points of a chart pattern into known position coordinates of a 3D object. The two-dimensional index represents the position of each corner in the checkered pattern by a two-dimensional integer matrix. Here, the position coordinates of the 3D object correspond to position coordinates of the feature points on the display surface of the display panel 12A. That is, the position coordinates of the feature points in the chart pattern included in the chart pattern image displayed on the display panel 12A correspond to the position coordinates of the feature points of the chart pattern as an actual object.

The camera calibration apparatus 22 includes a PC, a server, a dedicated device, or the like. The camera calibration apparatus 22 is connected to the chart pattern generation device 21 via a predetermined interface. The camera calibration apparatus 22 includes a table storage unit 201, a deflection-correction-data storage unit 202, a deflection correction unit 203, a table storage unit 204, a camera parameter estimation unit 205, and a camera parameter storage unit 206.

The table storage unit 201 records the ID correspondence table and conversion table output from the chart pattern generation device 21. The deflection-correction-data storage unit 202 records deflection correction data. The deflection correction data is data including a correction amount corresponding to the amount of deformation from an ideal state relating to the display surface of the display panel 12A of the display device 12.

The deflection correction unit 203 acquires the conversion table recorded on the table storage unit 201 and the deflection correction data recorded on the deflection-correction-data storage unit 202. The deflection correction unit 203 corrects the conversion table on the basis of the deflection correction data and records the corrected conversion table on the table storage unit 204.

The camera parameter estimation unit 205 acquires the captured image output from the imaging device 11 and the corrected conversion table recorded on the table storage unit 204. The camera parameter estimation unit 205 detects an image of feature points of the chart pattern from the captured image and generates feature point information in which the position coordinates of the image of the feature points and position coordinates of the feature points on the display surface of the display panel 12A are associated with each other. When generating feature point information, the corrected conversion table is used. The camera parameter estimation unit 205 performs calculation for calibration on the basis of the generated feature point information, acquires a predetermined camera parameter, and records it on the camera parameter storage unit 206.

The camera parameter estimation unit 205 may acquire the ID correspondence table recorded on the table storage unit 201 and perform processing using the ID correspondence table. For example, by using the ID correspondence table, it is possible to identify the panel ID from the marker ID obtained from the image of the marker included in the captured image and identify the display panel 12A displaying the chart pattern image. Further, by using the ID correspondence table, it is possible to identify a plurality of group IDs in a distinctive manner on the basis of the marker ID obtained from the captured image and integrate the feature points of a plurality of image frames of the captured image corresponding to the same group ID and the same panel ID on the display surface of the corresponding display panel 12A.

Figure 4:
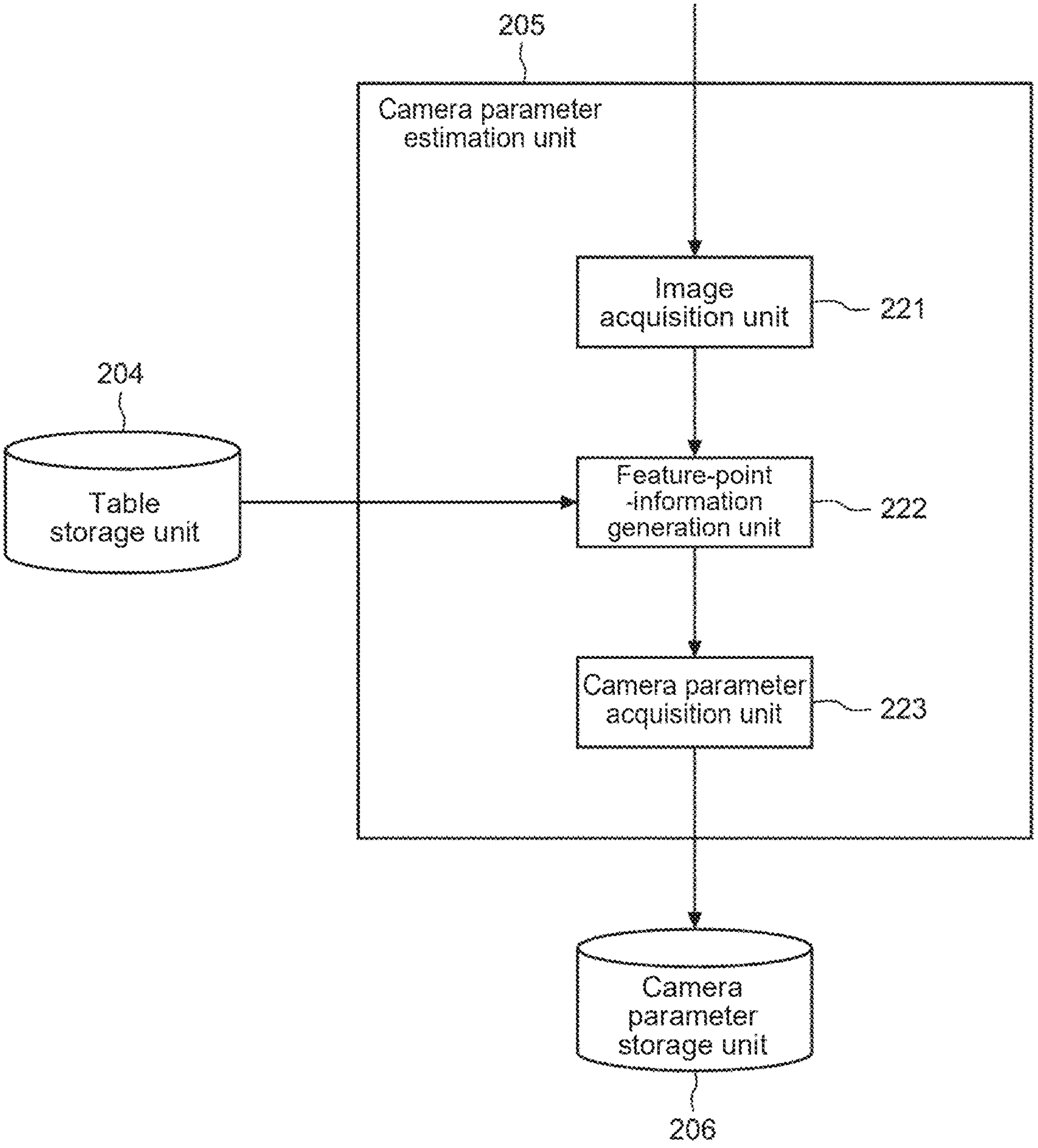
FIG. 4 is a block diagram showing a configuration example of the camera parameter estimation unit in FIG. 3.

FIG. 4 is a block diagram showing a configuration example of the camera parameter estimation unit 205. In FIG. 4, the camera parameter estimation unit 205 includes an image acquisition unit 221, a feature-point-information generation unit 222, and a camera parameter acquisition unit 223.

The image acquisition unit 221 acquires the captured image from the imaging device 11 and supplies the acquired captured image to the feature-point-information generation unit 222. In the case where the imaging device 11 includes the cameras 11A-1 to 11A-3, the optical sensor included in each camera 11A acquires the captured image including the image of the chart pattern displayed on the display panels 12A-1 and 12A-2.

The feature-point-information generation unit 222 detects the images of feature points and marker from the captured image and associates, for each display surface of the display panel 12A that displays the chart pattern identified by the marker the two-dimensional position coordinates (two-dimensional coordinates) of the detected image of the feature points and three dimensional position coordinates (three-dimensional coordinates) of the feature points on the display surface of the display panel 12A. At this time, the index is identified for each feature point and the position coordinates on the display surface of the display panel 12A, i.e., the three-dimensional coordinates on the display surface are identified from the index using the corrected conversion table recorded on the table storage unit 204. This allows, for each feature point, the two-dimensional coordinates in the captured image and the three-dimensional coordinates on the display surface of the display panel 12A to be associated with each other. The feature point information including correspondence information of the feature points obtained in this way is supplied to the camera parameter acquisition unit 223. For example, in the case where a checkered pattern is included as a chart pattern, a two-dimensional corner position in the checkered pattern can be used as a feature point.

The camera parameter acquisition unit 223 uses the correspondence information of the feature points included in the feature point information from the feature-point-information generation unit 222 as input data to specify and acquire a camera parameter such as an internal parameter and external parameter using an existing algorithm. The acquired camera parameter is recorded on the camera parameter storage unit 206.

Note that in FIG. 3, the chart pattern generation device 21, the camera calibration apparatus 22, and the display devices 12-1 and 12-2 can be connected via an interface corresponding to a predetermined communication method such as a wired method and a wireless method, and are capable of exchanging various types of data. Alternatively, the chart pattern image generated by the chart pattern generation device 21 may be provided to the display devices 12-1 and 12-2 or the ID correspondence table and the conversion table may be provided to the camera calibration apparatus 22 via a recording medium such as a memory card. In the former case, the display control unit 102 is provided on the side of the display devices 12-1 and 12-2. Although FIG. 1 to FIG. 3 show a configuration in which the two display devices 12, i.e., the display device 12-1 and the display device 12-2, are provided, one display device 12 including the display panel 12A-1 and the display panel 12A-2 may be provided.

Each block in the chart pattern generation device 21 and the camera calibration apparatus 22 is realized by hardware or software. For example, in the chart pattern generation device 21, the generation unit 101 and the display control unit 102 are realized by a processor such as a CPU (Central Processing Unit) executing a program. In the camera calibration apparatus 22, the deflection correction unit 203 and the camera parameter estimation unit 205 are realized by a processor such as a CPU executing a program. Further, in the camera calibration apparatus 22, the table storage unit 201, the deflection-correction-data storage unit 202, the table storage unit 204, and the camera parameter storage unit 206 are realized by a storage device such as a ROM (Read Only Memory), a RAM (Random Access Memory), an SSD (Solid State Drive), and an HDD (Hard Disk Drive). Note that the table storage unit 201, the deflection-correction-data storage unit 202, the table storage unit 204, and the camera parameter storage unit 206 may include the same storage device or different storage devices. The ID correspondence table and the conversion table may be recorded on the different storage device.

<Generation/Displaying of Chart Pattern>

Figure 5:
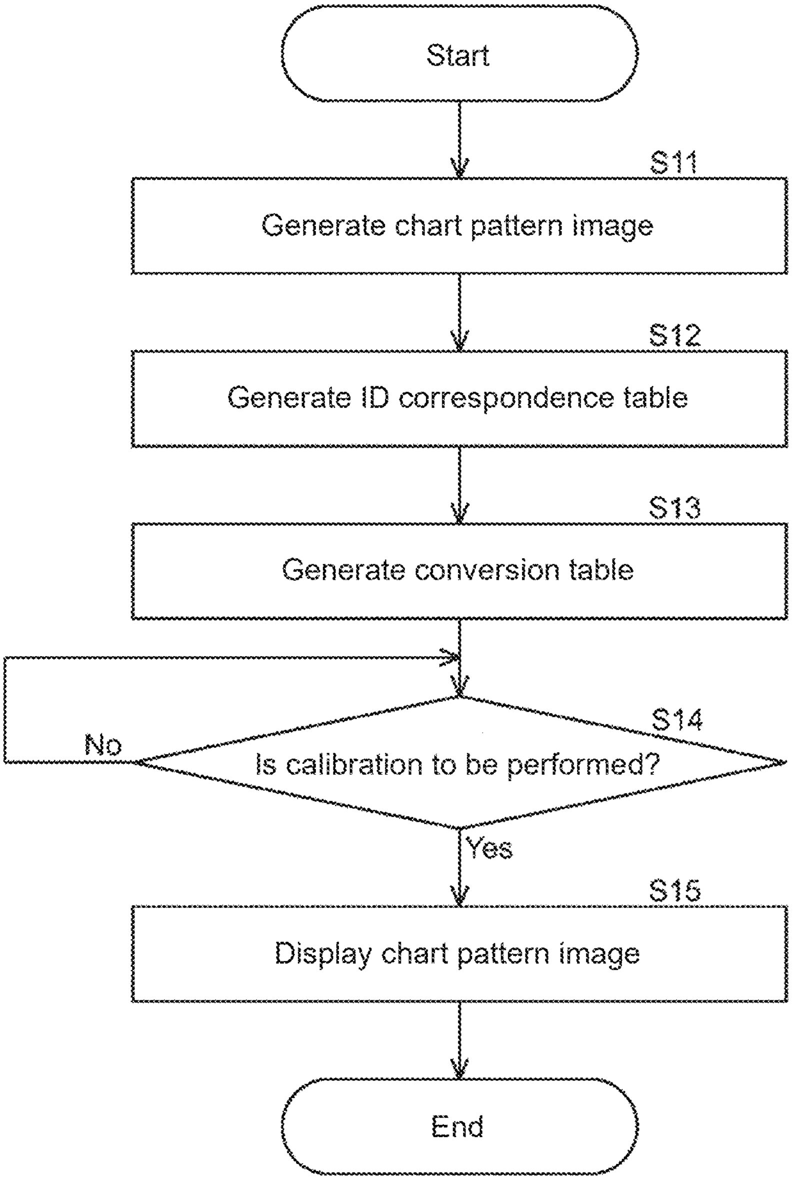
FIG. 5 is a flowchart describing a flow of processing of generating and displaying a chart pattern.

The details of generation and displaying of a chart pattern executed by the chart pattern generation device 21 will be described. FIG. 5 is a flowchart describing a flow of processing of generating and displaying a chart pattern.

In Step S11, the generation unit 101 generates a chart pattern image including the image of a chart pattern on the basis of the internal parameter. The chart pattern image is displayed on each of the display device 12-1 and the display device 12-2 while changing over time. For this reason, the generation unit 101 generates a plurality of types of chart pattern images with different chart patterns for each display device 12.

Figure 6:
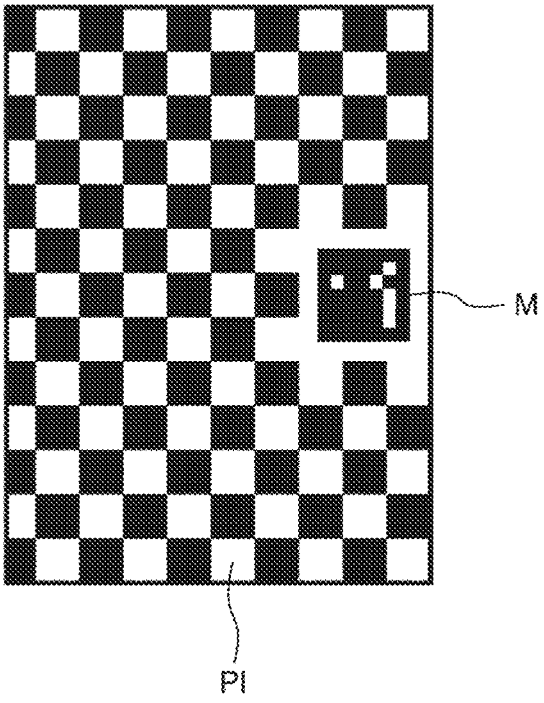
FIG. 6 is a diagram showing an example of a chart pattern image.

FIG. 6 is a diagram showing an example of a chart pattern image. As shown in FIG. 6, a checkered pattern is disposed over the entire chart pattern image PI and a marker M is disposed in a specific region. In the marker M, a marker ID that is an identification ID unique to the chart pattern is embedded. As the marker M, an AR marker can be used. For example, as the AR marker, an ARUCO marker that can be used in OpenCV, which is a representative open source image processing software library, or the like can be used. The ARUCO marker is described in, for example, the following literature A.

Literature A: S. Garrido-Jurado, R. Munoz-Salinas, F. J. Madrid-Cuevas, and M. J. Marin-Jimenez. "Automatic generation and detection of highly reliable fiducial markers under occlusion". Pattern Recognition. Vol 47, No 6. 2014, June, pp. 2280-2292

In the chart pattern included in the chart pattern image PI, the feature points are vertices (corners) of each rectangle. Note that the chart pattern represented by the chart pattern image PI is not limited to a checkered pattern (chessboard), and the feature points only need to be distributed in a shape or arrangement that is easy to detect using an existing search method. For example, by adopting a feature point arrangement forming an orthogonal system, such as a circle grid in which black circles are arranged vertically and horizontally, detection of a feature point and acquisition of the attribute can be made easier. A pattern that allows a feature point to be detected easily with the sub-pixel accuracy of the display panel 12A is suitable.

With reference to FIG. 5 again, in Step S12, the generation unit 101 generates an ID correspondence table. In the ID correspondence table, a panel ID (panel_id) and a group ID (frame_group_id) are associated with a marker ID (marker_id). The panel ID is an ID for identifying the display panel 12A of the display device 12. For example, the display panel 12A-1 is represented by panel_id=1, and the display panel 12A-2 is represented by panel_id=2. The group ID is an identification ID for determining whether or not the position/attitude relationship between the camera 11A included in the imaging device 11 and the chart pattern image PI displayed on the display device 12 is the same. The group ID is assigned for each (image frame of) chart pattern image PI in accordance with the position and attitude of the camera 11A.

FIG. 7 is a diagram showing an example of an ID correspondence table (marker_id_table). In the ID correspondence table in FIG. 7, a panel ID and a group ID are associated with a marker ID, and the marker ID can be converted into the panel ID and the group ID. The combination of the panel ID and the group ID is a plane ID (plane_id).

Figure 8:
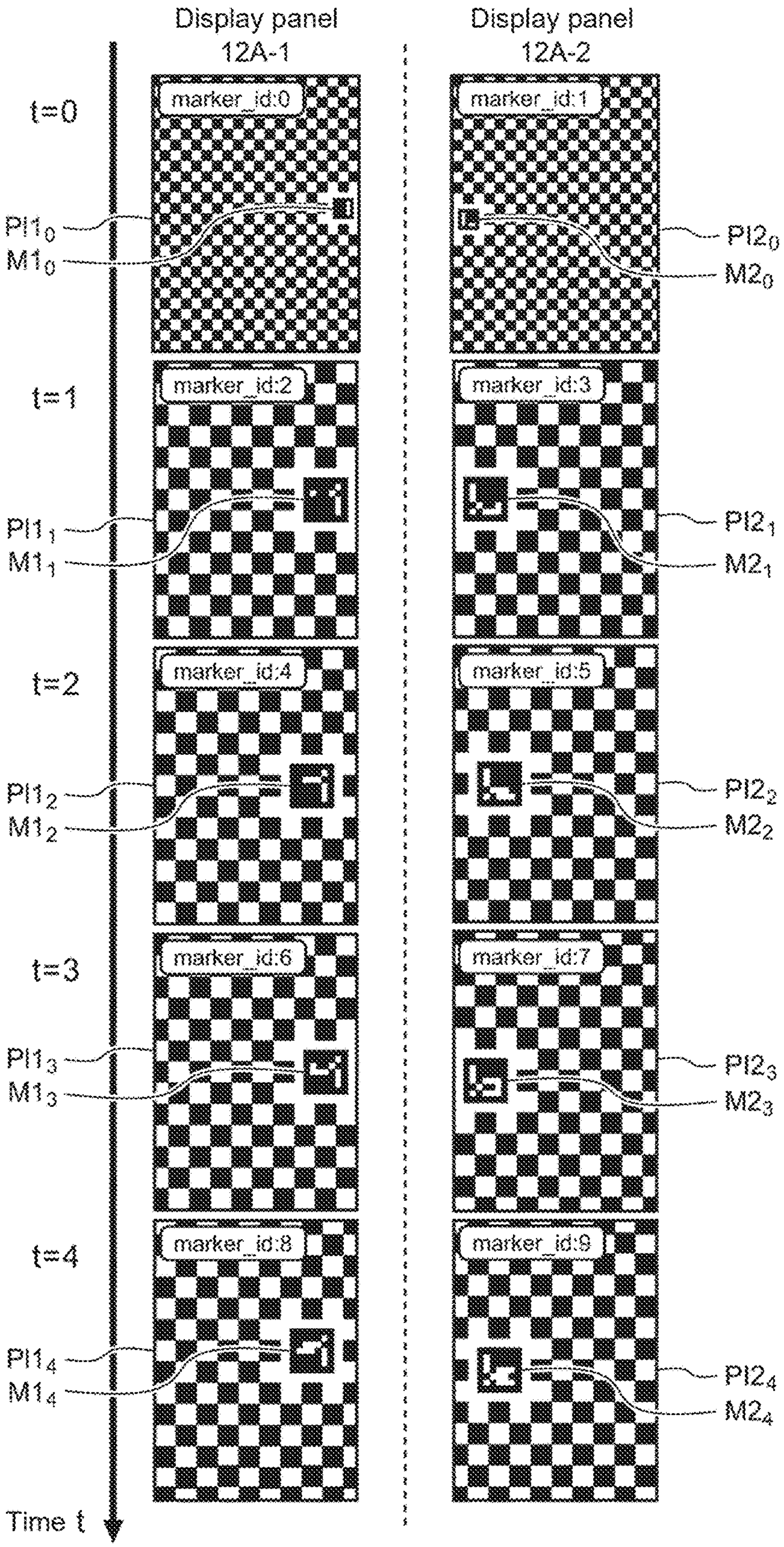
FIG. 8 is a diagram showing an example of a display sequence of a chart pattern image.

FIG. 8 shows an example of a display sequence of a chart pattern image. In FIG. 8, the time axis runs from top to bottom in the figure, and the chart pattern image PI1 displayed on the display panel 12A-1 of the display device 12-1 and the chart pattern image PI2 displayed on the display panel 12A-2 of the display device 12-2 are shown in chronological order.

At a time t=0, a chart pattern image $PI1_0$ including a marker $M1_0$ in which marker_id=0 is embedded is displayed on the display panel 12A-1, and a chart pattern image $PI2_0$ including a marker $M2_0$ in which marker_id=1 is embedded is displayed on the display panel 12A-2. At this time, in the ID correspondence table in FIG. 7, panel_id=1 is associated with marker_id=0 and panel_id=2 is associated with marker_id=1 (row of "t=0").

At times t=1 to 4, chart pattern images $PI1_1$ to $PI1_4$ with markers embedded with marker_id=2, 4, 6, and 8 are sequentially displayed on the display panel 12A-1. At the times t=1 to 4, chart pattern images $PI2_1$ to $PI2_4$ with markers embedded with marker_id=3, 5, 7, and 10 are sequentially displayed on the display panel 12A-2. At this time, in the ID correspondence table in FIG. 7, panel_id=1 is associated with marker_id=2, 4, 6, and 8, and panel_id=2 is associated with marker_id=3, 5, 7, and 9 (row of "t=1 to 4").

In FIG. 8, the density of the chart pattern differs between the chart pattern images $PI1_0$ and $PI2_0$ displayed on the display panels 12A-1 and 12A-2 at the time t=0 and the chart pattern images $PI1_1$ to $PI1_4$ and $PI2_1$ to $PI2_4$ displayed on the display panels 12A-1 and 12A-2 at the times t=1 to 4. As a result, the sub-pixel accuracy of each camera 11A of the imaging device 11 corresponds to one of the chart pattern images having different density of the feature point group. The chart pattern images $PI1_0$ and $PI2_0$ may each be regarded as a high-resolution chart pattern having relatively high density of the feature point group. Further, the chart pattern images $PI1_1$ to $PI1_4$ and $PI2_1$ to $PI2_4$ may each be regarded as a low-resolution chart pattern having relatively low density of the feature point group. For example, the calibration of a non-visible light sensor having the number of pixels arranged two-dimensionally on the light-receiving surface, which is smaller than that of a visible light sensor, is performed on the basis of a low-resolution chart pattern having low density of the chart pattern.

For example, the camera 11-1 and the camera 11-2 are each an RGB camera including a visible light sensor and generate a high-resolution captured image. For this reason, at the time t=0, the camera 11-1 and the camera 11-2 only need to the chart pattern images $PI1_0$ and $PI2_0$ having high density of the feature point group of the chart pattern. That is, the chart pattern images $PI1_0$ and $PI2_0$ displayed at the time t=0 each include a high-resolution chart pattern.

Meanwhile, the camera 11-3 is a ToF camera including a ToF sensor and generates a high-resolution captured image. For this reason, at the times t=1 to 4, the camera 11-3 sequentially acquires the images of the chart pattern images $PI1_1$ to $PI1_4$ and $PI2_1$ to $PI2_4$ having low density of the feature point group of the chart pattern. That is, the chart pattern images $PI1_1$ to $PI1_4$ and $PI2_1$ to $PI2_4$ displayed at the times t=1 to 4 each include a low-resolution chart pattern. As a result, during the period of the times t=1 to 4, a low-resolution camera is capable of acquiring a captured image of a low-resolution chart pattern corresponding to the sub-pixel accuracy and reliably detecting feature points (corners). Meanwhile, since the density of feature point group of each low-resolution chart pattern is low, information of a feature point to be used for calibration cannot be sufficiently obtained from one low-resolution chart pattern in some cases. For this reason, by integrating the different low-resolution chart pattern images $PI1_1$ to $PI1_4$ and $PI2_1$ to $PI2_4$ on a single plane (same plane), the increase in the density of the feature point group is achieved. In the present disclosure, information of the feature points integrated on the same plane is referred to as integrated feature point information in some cases.

The density of the feature point group of the chart pattern can be changed in accordance with not the resolution of the captured image generated by the camera 11A but the angle of view of the camera 11A. For example, in the case of the camera 11A having a wide angle of view, the chart pattern images $PI1_1$ to $PI1_4$ and $PI2_1$ to $PI2_4$ having low density of the chart pattern only need to be taken. Meanwhile, in the case of the camera 11A having a narrow angle of view, the chart pattern images $PI1_0$ and $PI2_0$ having high density of the feature point group of the chart pattern only need to be taken. Further, the density of the feature point group of the chart pattern can also be changed in accordance with the distortion shape of the lens included in the camera 11A. At this time, the imaging device 11 does not necessarily need to include a plurality of cameras 11A and the chart pattern that changes over time may be imaged by one camera 11A.

A case where the position/attitude relationship between the cameras 11-1 to 11-3 and the chart pattern image PI has changed due to the change in the position at which the imaging device 11 is disposed after a time t5 although not shown in the display sequence in FIG. 8 is assumed. In this case, a chart pattern image $PI1_5$ with a marker embedded with marker_id=10 is displayed on the display panel 12A-1 and a chart pattern image $PI2_5$ with a marker embedded with marker_id=11 is displayed on the display panel 12A-2.

At this time, in the ID correspondence table in FIG. 7, panel_id=1 and frame_group_id=1 are associated with marker_id=10 and panel_id=2 and frame_group_id=1 are associated with marker_id=11 (row of "t=5"). That is, frame_group_id differs between marker_id=0 to 9 and marker_id=10 and 11. In this way, whether or not the feature points (corners) are on the chart pattern image taken by the camera 11A with the same position/attitude relationship can be determined using the group ID. The plane ID is used to identify whether or not the feature points (corners) are on the same plane. Here, the same plane corresponds to the display surface of the same display panel 12A and corresponds to the plane of the chart pattern as a real object when the position/attitude relationship is the same.

With reference to FIG. 5 again, in Step S13, the generation unit 101 generates a conversion table. In the conversion table, two-dimensional indices (two-dimensional corner indices) representing the positional relationship of feature points in the chart pattern (two-dimensional corner positions in the checkered pattern) and position coordinates of the display panel 12A are associated with each other. Here, the position coordinates of the feature points of the image of the chart pattern included in the chart pattern image displayed on the display panel 12A are regarded as position coordinates on the display surface of the display panel 12A. Since the position coordinates of the chart pattern with respect to the display panel 12A only need to be known as information necessary for calibration, two-dimensional position coordinates are substantially sufficient.

When generating a chart pattern image, squares of a checkered pattern are arranged such that a maker embedded with a marker ID becomes the reference of a two-dimensional index. Then, for each marker ID, a conversion table capable of converting two-dimensional indices (i, j) representing feature points that are two-dimensional corner positions into position coordinates (X, Y, Z) with reference to the display surface of the display panel 12A is generated.

Hereinafter, the position coordinates with reference to the display surface of the display panel 12A will be referred to simply as position coordinates on the display panel 12A in some cases.

Figure 9:
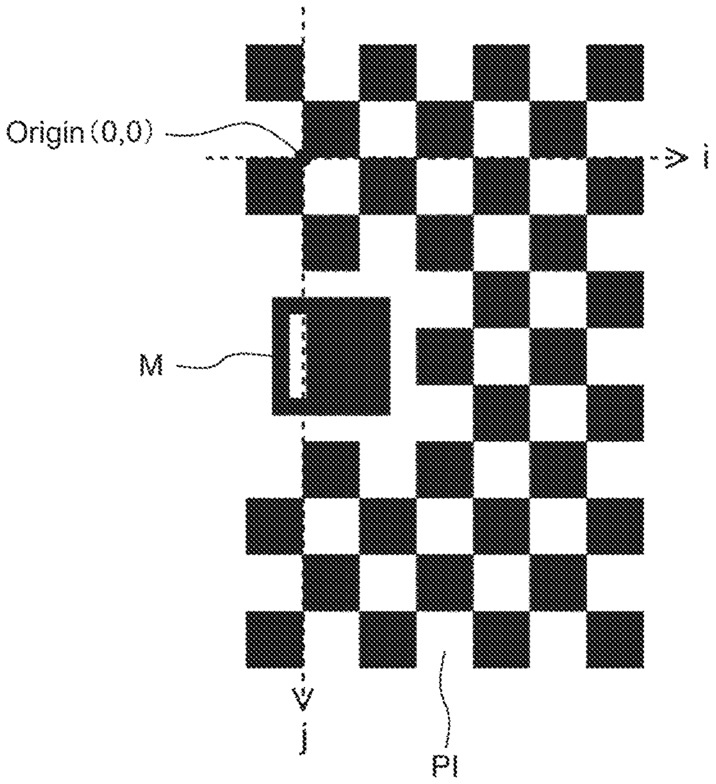
FIG. 9 is a diagram showing an example of a two-dimensional corner position on the chart pattern image.

FIG. 9 is a diagram showing an example of a two-dimensional corner position as a feature point on a chart pattern image. In FIG. 9, the top left vertex of the square two squares above the marker M is set as the origin (0, 0) of the coordinate system of the two-dimensional index (i, j). However, i and j are each an integer value.

Here, for example, for the display panel 12A of the display device 12, the lateral and longitudinal physical sizes (unit: mm) are respectively represented by panel_width and panel_height, the lateral and longitudinal numbers of display pixels (unit: pix) are respectively represented by screen_width and screen_height, the size of one corner (unit: pix) is represented by corner_size, and the number of pixels to be offset (unit: pix) is represented by offset_x and offset_y. At this time, the position coordinates (X, Y, Z) of arbitrary two-dimensional indices (i, j) on the display panel 12A are expressed as follows.

$$X=(\text{panel\_width}/\text{screen\_width})*\text{corner\_size}*i$$

$$Y=(\text{panel\_height}/\text{screen\_height})*\text{corner\_size}*j$$

$$Z=0$$

A conversion table for converting two-dimensional indices (i, j) into position coordinates (X, Y, Z) on the display panel 12A can be generated using these relationships. FIG. 10 is a diagram showing an example of a conversion table (table_ij_to_XYZ(marker_id)). In the conversion table in FIG. 10, the two-dimensional indices (i, j) and the position coordinates (X, Y, Z) on the display panel 12A are associated with each other, and the two-dimensional indices (i, j) can be converted into the position coordinates (X, Y, Z) on the display panel 12A. Here, the position coordinates (X, Y, Z) on the display panel 12A are expressed as two-dimensional position coordinates (X, Y) with Z=0.

In this way, when generating a chart pattern image, an ID correspondence table (FIG. 7) and a conversion table (FIG. 10) are generated as a database that can be expanded using a marker ID embedded in a marker as a key. The ID correspondence table and the conversion table are output from the chart pattern generation device 21 to the camera calibration apparatus 22 and recorded on the table storage unit 201.

With reference to FIG. 5 again, in Step S14, whether or not camera calibration is to be performed is determined. In the case where camera calibration is to be performed (S14: Yes), the processing proceeds to Step S15. In Step S15, the display control unit 102 displays the chart pattern image PI1 on the display panel 12A-1 of the display device 12-1 and the chart pattern image PI2 on the display panel 12A-2 of the display device 12-2.

Here, a plurality of types of chart pattern images generated in accordance with the resolution and the angle of view is displayed while changing over time (displayed in a time division manner). For example, as shown in the display sequence in FIG. 8, at the times t=0 to 4, the chart pattern images $PI1_0$ to $PI1_4$ are sequentially displayed on the display panel 12A-1 and the chart pattern images $PI2_0$ to $PI2_4$ are sequentially displayed on the display panel 12A-2. During camera calibration, these chart pattern images PI1 and PI1 whose chart patterns change over time are imaged by each camera 11A of the imaging device 11 to acquire a captured image.

The details of generation and displaying of a chart pattern have been described above. In the generation and displaying of a chart pattern, before camera calibration, a chart pattern image including a chart pattern optimized in accordance with the camera 11A to be calibrated is generated. Further, an ID correspondence table and a conversion table are generated and provided to the camera calibration apparatus 22. After that, during camera calibration, the generated chart pattern image is displayed on each of the plurality of display panels 12A and imaged by the camera 11A to be calibrated.

<Camera Calibration>

The camera calibration in the present disclosure is applicable not only to a visible light camera but also to a non-visible light camera that images structured light or the like using infrared light. In the structured light method, it is common to project an infrared light pattern to perform depth measurement based on the principle of triangulation, and a non-visible light camera supporting the method is configured to image an infrared light image. In the case where the camera calibration in the present disclosure is applied to a non-visible light camera, an IR light source capable of performing uniform irradiation is installed to illuminate a chart pattern image and the non-visible light camera as the camera 11A images the chart pattern image. The non-visible light camera as the camera 11A includes a ToF camera. Details of camera calibration executed by the camera calibration apparatus 22 will be described below. FIG. 11 is a flowchart describing a flow of camera calibration processing.

In Step S31, the deflection correction unit 203 performs deflection correction on the conversion table recorded on the table storage unit 201. For example, in the case where the display device 12 includes electronic paper, it is difficult to perform calibration with high accuracy when the flatness is insufficient due to the deflection of the display panel 12A. In this regard, deflection correction processing on the conversion table is performed to correct the position coordinates on the display panel 12A to the position coordinates corresponding to the deflection of the display panel 12A. This allows calibration to be performed with high accuracy even in the case where a chart pattern image is displayed on electronic paper.

In the deflection correction processing, the position coordinates (X, Y, Z) on the display panel 12A of the two-dimensional indices (i, j) stored in the conversion table (FIG. 10) are corrected using deflection correction data to obtain the corrected position coordinates (X', Y', Z') on the display panel 12A. The deflection correction data is recorded on the deflection-correction-data storage unit 202. The deflection correction data is generated in chart pattern calibration described below.

Figure 13:
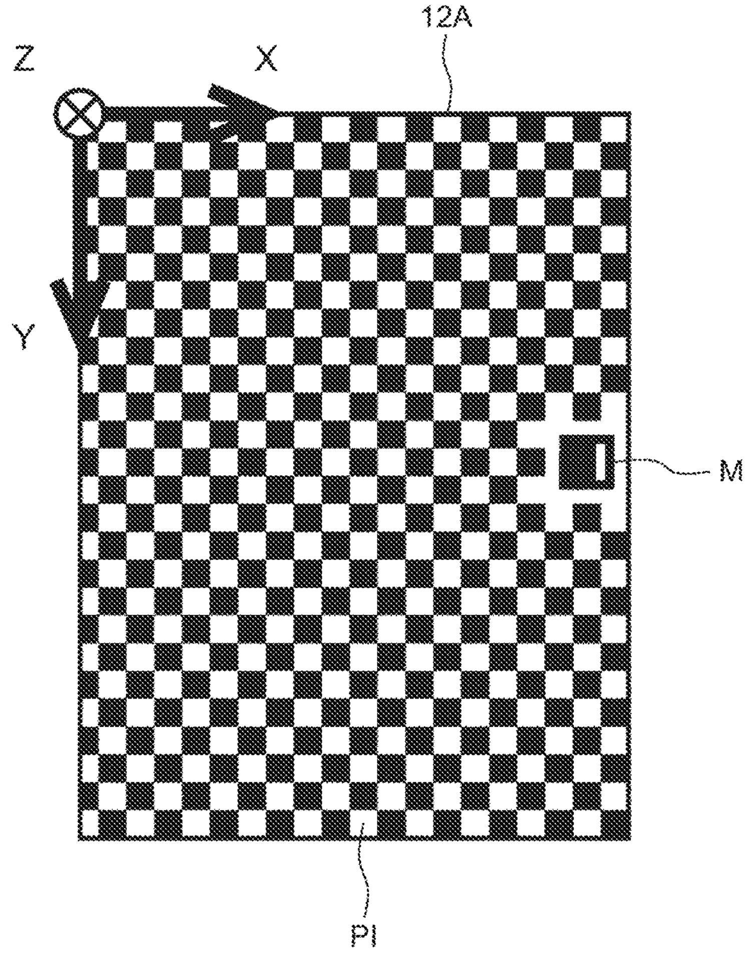
FIG. 13 is a diagram showing an example of a coordinate system in deflection correction.

FIG. 12 is a diagram showing an example of deflection correction data. The deflection correction data is prepared for each display panel 12A. In the deflection correction data in FIG. 12, original position coordinates ($X_{org}$, $Y_{org}$, $Z_{org}$) on the display panel 12A and correction amounts (ΔX, ΔY, ΔZ) are associated with each other. However, since $Z_{org}$ is all 0, it is omitted in FIG. 12. As shown in FIG. 13, in the deflection correction processing, a three-dimensional coordinate system with the upper left corner of the display surface of the display panel 12A in the display device 12 as the origin can be used.

Figure 14:
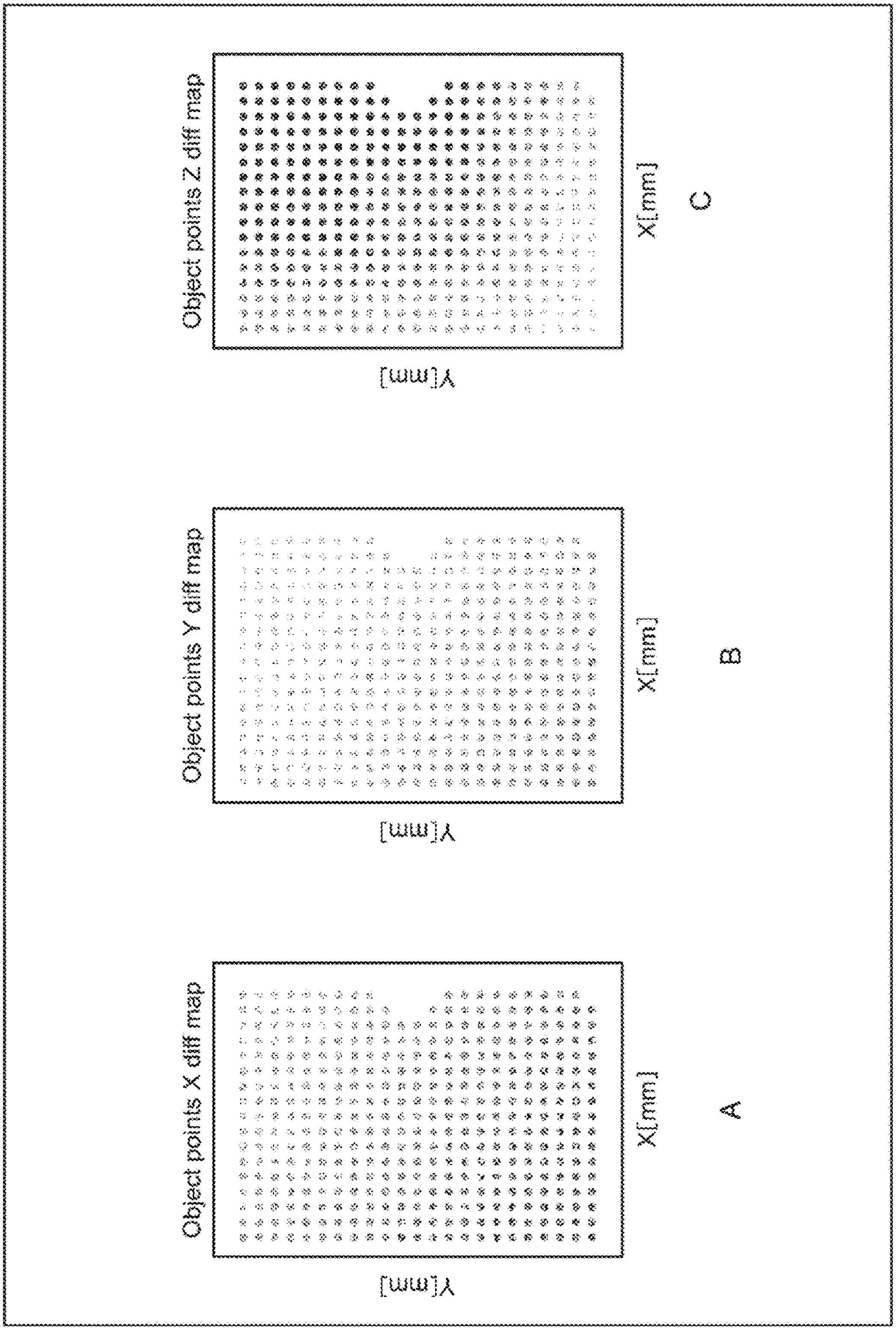
FIG. 14 is a diagram schematically showing deflection correction maps.

FIG. 14 is a diagram schematically showing deflection correction maps. The deflection correction maps in FIG. 14 are maps that visualize the correction amounts ΔX, ΔY, and ΔZ with X as the horizontal axis and Y as the vertical axis and correspond to the plane of the display panel 12A. Parts A, B, and C of FIG. 14 respectively show the correction amounts ΔX, ΔY, and ΔZ, and show that the correction amount ΔZ is large. The original position coordinates (X, Y, Z) on the display panel 12A that are deflection correction targets can be treated as points on the XY plane because Z=0. For this reason, interpolation is performed with reference to the object coordinates ($X_{org}$, $Y_{org}$) of deflection correction data in the vicinity of the position coordinates (X, Y) on the display panel 12A.

Regarding the correction amounts (ΔX, ΔY, ΔZ), the correction amounts obtained by performing interpolation processing (e.g., bilinear interpolation) and extrapolation processing (e.g., holding at a neighborhood value) on the XY plane are respectively applied as $\Delta X_{interpolated}$, $\Delta Y_{interpolated}$, and $\Delta Z_{interpolated}$ to the original position coordinates (X, Y, Z) on the display panel 12A, the position coordinates (X', Y', Z') on the display panel 12A after the deflection correction are expressed as follows.

$$X'=X+\Delta X_{interpolated}$$

$$Y'=Y+\Delta Y_{interpolated}$$

$$Z'=0+\Delta Z_{interpolated}$$

Figure 15:
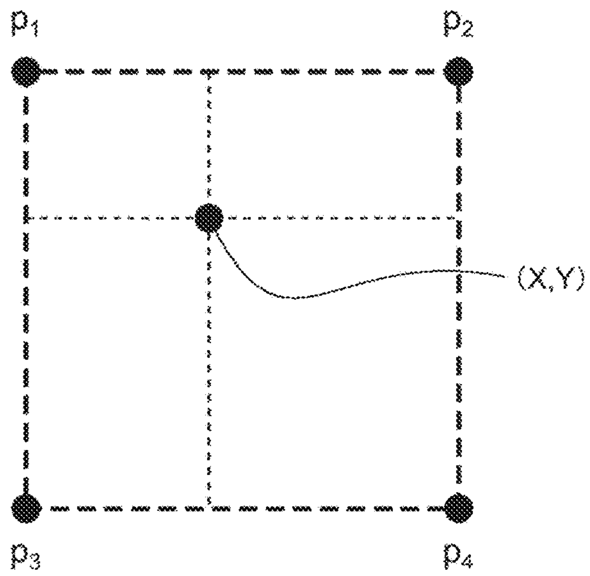
FIG. 15 is a diagram showing an example of a case where bilinear interpolation is performed as interpolation processing.

FIG. 15 is a diagram showing an example of a case where bilinear interpolation is performed as interpolation processing. As shown in FIG. 15, bilinear interpolation can be performed with reference to the correction amounts (ΔX, ΔY, ΔZ) of four points ($p_1$ to $p_4$) surrounding the position coordinates (X, Y) on the display panel 12A on the deflection correction map.

In this way, deflection correction can be performed at arbitrary points (X, Y) on the XY plane of the display panel 12A, and the position coordinates (X, Y, Z) on the display panel 12A of the two-dimensional indices (i, j) are corrected to the position coordinates (X', Y', Z') on the display panel 12A. Then, the conversion table storing the position coordinates (X', Y', Z') after the deflection correction is recorded on the table storage unit 204.

Figure 16:
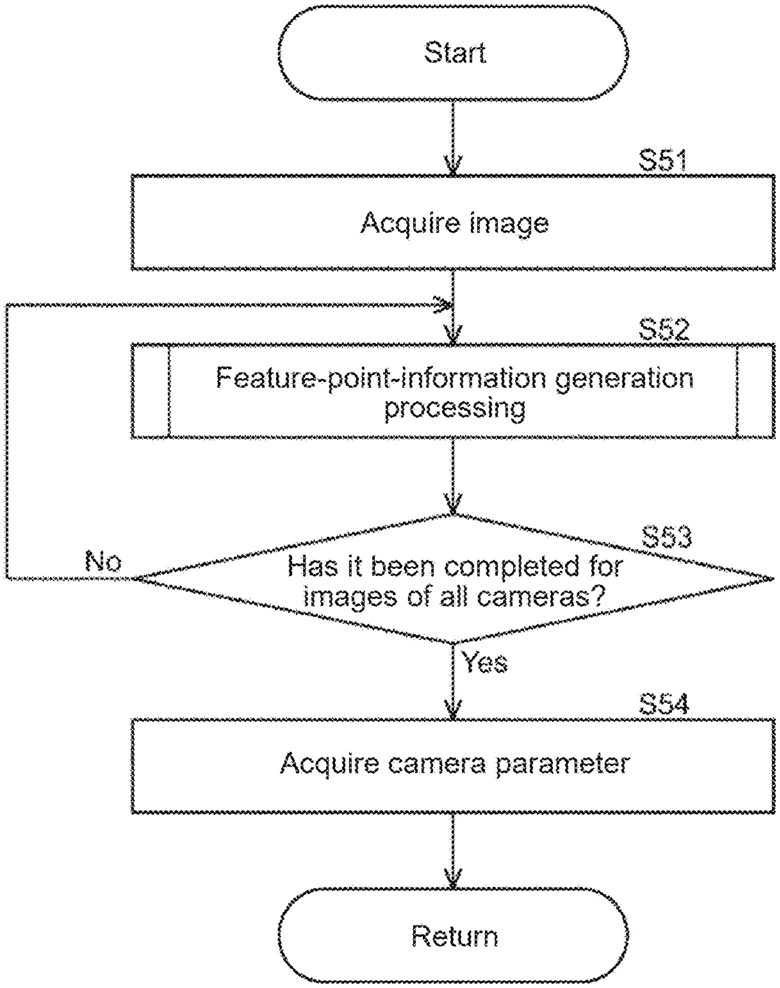
FIG. 16 is a flowchart describing a detailed flow of camera parameter estimation processing.

With reference to FIG. 11 again, in Step S32, the camera parameter estimation unit 205 performs camera parameter estimation processing. Now, a detailed flow of the camera parameter estimation processing will be described with reference to the flowchart of FIG. 16.

In Step S51, the image acquisition unit 221 acquires a captured image generated by each camera 11A of the imaging device 11. For example, the cameras 11A-1 to 11A-3 images the chart pattern images PI1 and PI2 displayed on the display panels 12A-1 and 12A-2 of the display devices 12-1 and 12-2 to acquire a captured image I (frame, view) for each viewpoint (view=0, 1, 2 . . . ) of the camera 11A.

For example, as shown in the display sequence in FIG. 8, the chart pattern image $PI1_0$ to $PI1_4$ are sequentially displayed on the display panel 12A-1 and the chart pattern image $PI2_0$ to $PI2_4$ are sequentially displayed on the display panel 12A-2. The cameras 11A-1 to 11A-3 acquire a plurality of image frames obtained by imaging the chart pattern image PI that changes over time in the state in which the position/attitude relationship is the same (state of maintaining the position/attitude relationship). The plurality of image frames will be referred to simply as captured images in some cases.

Note that noise reduction processing may be performed by adding the plurality of image frames obtained by imaging in the state in which the position/attitude relationship is the same. For example, image frames in the amount of 16 frames can be added for each corresponding pixel to acquire an average value, and one frame of image with the average value as the pixel value can be generated.

In Step S52, the feature-point-information generation unit 222 performs feature-point-information generation processing. In the feature-point-information generation processing, the index of each feature point is obtained on the basis of the positional relationship with the image of the marker detected from the captured image and is converted into position coordinates in the chart pattern image displayed on the display panel 12A. As a result, feature point information that associates the position coordinates of the feature points on the captured image and the position coordinates on the display panel 12A of the chart pattern image displayed on the display panel 12A with each other is generated.

The feature-point-information generation processing (S52) is repeated for the captured images (all image frames) acquired by all cameras 11A included in the imaging device 11 (S53: No). As a result, in the feature-point-information generation processing, a list (corners_list(view, plane_id)) that stores the two-dimensional position coordinates (u, v) corresponding to each feature point (corner) on the same plane (that can be identified by plane_id) and the position coordinates (X', Y', Z') on the display panel 12A is generated as feature point information for each viewpoint (view=0, 1, 2 . . . ) of the camera 11A.

Here, for example, in the case where the imaging device 11 includes a low-resolution camera and a high-resolution camera, the feature-point-information generation unit 222 is capable of generating integrated feature point information based on a low-resolution chart pattern (chart pattern images $PI1_1$ to $PI1_4$ and $PI2_1$ to $PI2_4$ in FIG. 8) acquired from the low-resolution camera and high-resolution feature point information based on a high-resolution chart pattern (chart pattern images $PI1_0$ and $PI2_0$ in FIG. 8) acquired from the high-resolution camera. Details of the feature-point-information generation processing will be described with reference to the flowchart of FIG. 17. In the case where the feature-point-information generation processing has been completed for all captured images generated by all cameras 11A (S53: Yes), the processing proceeds to Step S54.

In Step S54, the camera parameter acquisition unit 223 performs calibration processing using feature point information to acquire a camera parameter. For this calibration processing, for example, the existing technology described in the following literature B can be used.

Literature B: Zhengyou Zhang, "A Flexible New Technique for Camera Calibration", IEEE Transactions on Pattern Analysis and Machine Intelligence, 22(11):1330-1334, 2000.

The camera parameter acquisition unit 223 uses correspondence information (corners_list(view, plane_id)) of the feature points included in the feature point information as an input parameter to specify the camera parameter using an existing algorithm. As the camera parameter, an internal parameter (e.g., a camera matrix A (view) or a lens distortion coefficient K (view)) for each camera 11A (view=0, 1, 2 . . . ) can be estimated. For example, in the case of using the Zhang's method, instead of feature point information in an image of a flat chart imaged from a plurality of viewpoints, feature point information in a plurality of planes (planes of the chart patterns identified by the plurality of detected plane_ids) in the captured image obtained at one time of imaging can be used.

Since a rotation matrix R and a translation vector t (position/attitude relationship between the camera 11A and the chart pattern image) are also obtained together, an external parameter (e.g., R(view0, view1) or t(view0, view1)) such as the mutual relationship between the plurality of cameras 11A configured as a multi-lens camera can also be estimated on the basis of these. As a method of identifying the rotation matrix R and the translation vector t, an open source software library such as the cv::CalibrateCamera( ) function implemented as OpenCV can be used.

The estimated camera parameter is recorded on the camera parameter storage unit 206. Alternatively, the camera parameter may be transmitted to the imaging device 11. By holding the camera parameter in the imaging device 11, appropriate correction can be performed within the imaging device 11. Alternatively, the camera parameter may be transmitted to a different device that performs processing using the image generated by the imaging device 11.

Figure 17:
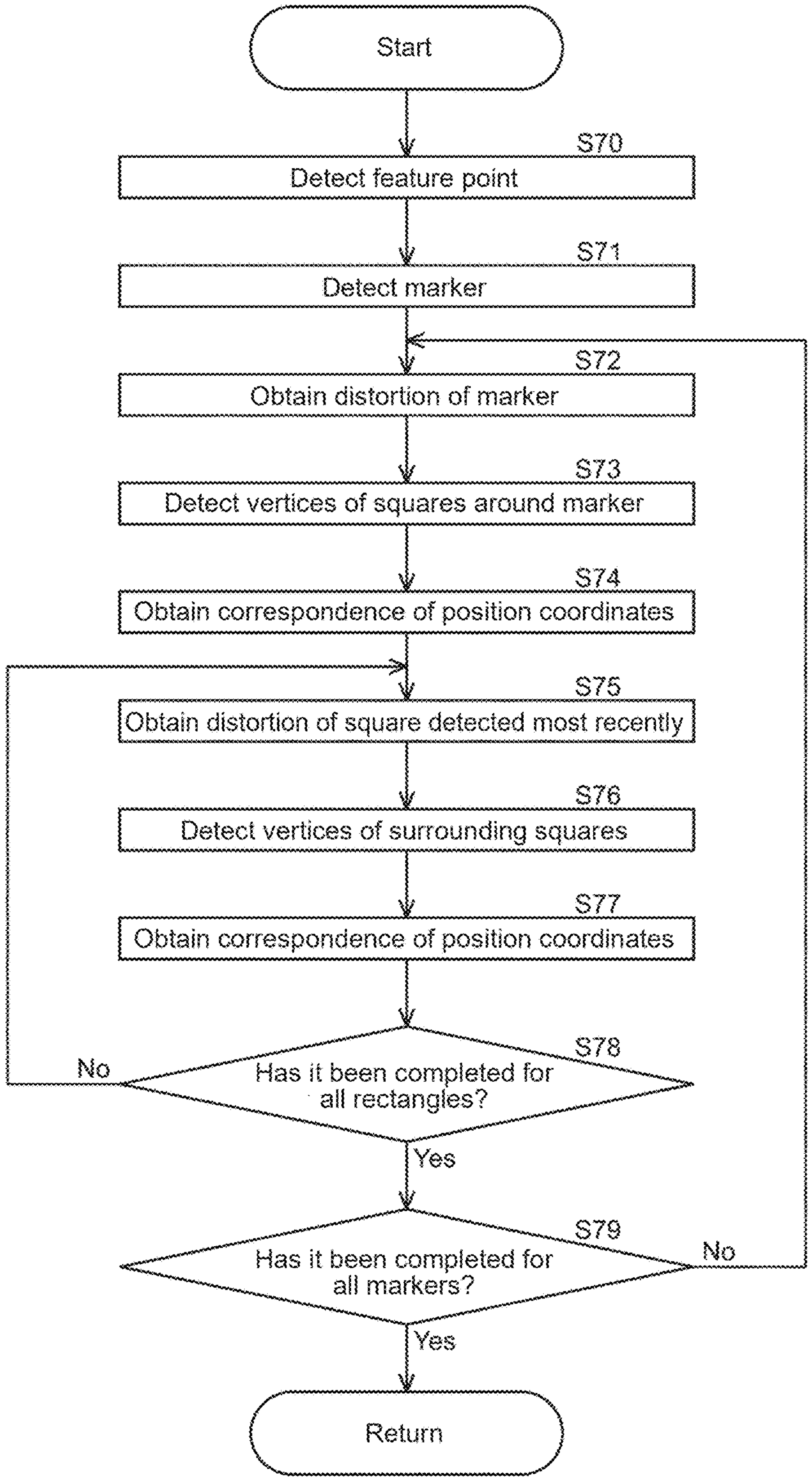
FIG. 17 is a flowchart describing a detailed flow of feature-point-information generation processing.
Figure 18:
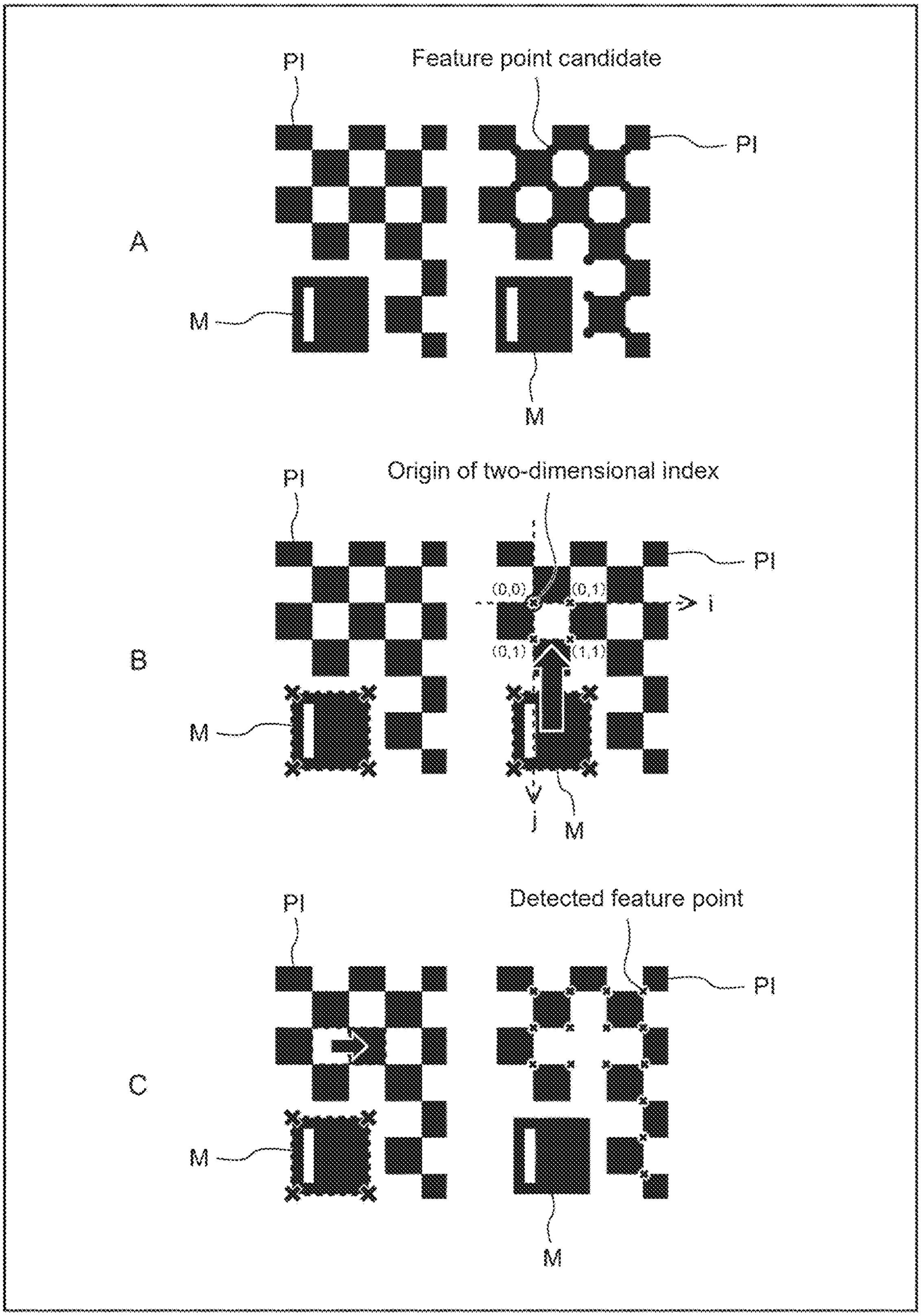
FIG. 18 is a diagram schematically showing the processing content of the feature-point-information generation processing.

When the processing of Step S54 is completed, the processing returns to Step S32 in FIG. 11, and the series of processes ends. Here, details of the feature-point-information generation processing corresponding to Step S52 in FIG. 16 will be described with reference to the flowchart of FIG. 17. In the description of FIG. 17, the schematic diagrams of captured images shown in FIG. 18 and FIG. 19 will be referred to as appropriate. FIG. 18 is a diagram showing part of the captured image in which the image of a marker in the captured image is enlarged.

First, the image of a feature point is detected from the captured image (S70). Various methods have been put to practical use as methods of detecting the vertices of squares of a checkered pattern as feature points, and any method may be used here. For example, in the case of using a method using Harris features, those having the feature value of a predetermined value or more are extracted as vertices (corners) of squares. The method using the Harris features is described in, for example, the following literature C.

Literature C: C. Harris and M. Stephens, "A combined corner and edge detector", Proceedings of the 4th Alvey Vision Conference, 1988, pp. 147-151

However, since the position coordinates obtained by this method have insufficient accuracy in some cases, it is desirable to detect position coordinates (u, v) in the captured image with the sub-pixel accuracy using two edge luminance gradients. For this processing, the cv::FindCornerSubPix( ) function of OpenCV or the like can be used. For example, by detecting the image of feature points (corners) from the captured image, the position coordinates (u, v) of a feature point candidate on the captured image are obtained (Part A of FIG. 18).

Next, the image of a maker in the captured image is detected (S71). For example, by detecting the image of a marker, a marker ID and four two-dimensional coordinate group surrounding the maker are obtained (Part B of FIG. 18). Then, for one of the detected markers, a parameter that represents the distortion on the image is acquired (S72). Specifically, a homography matrix Hmarker that converts four vertices of a rectangle having sides in the horizontal and vertical directions that should originally appear as the image of the marker into four vertices of the actual image of the marker is acquired.

Subsequently, the marker is used as the base point to detect vertices of squares around the marker (S73). At this time, by converting the four vertices of the square that should originally appear as the image of the square using the homography matrix Hmarker acquired in S72, approximate positions of the four vertices can be identified taking into account the distortion occurring in the vicinity thereof. Then, a feature point (corner) that has been effectively detected is searched for around the converted position coordinates (for example, within a range of approximately 0.5 pixels). Since the two-dimensional index of the detected feature point is clear from the positional relationship with the marker, this processing results in association of the position coordinates (u, v) of the feature point in the captured image and the two-dimensional index with each other (Part B of FIG. 18).

Next, by identifying the corrected position coordinates (X', Y', Z') on the display panel 12A (however, Z'=0) from the two-dimensional indices (i, j), the position coordinates (u, v) of the feature point and the corrected position coordinates (X', Y', Z') on the display panel 12A are associated with each other (S74). For the conversion of position coordinates, the corrected conversion table (table_ij_to_XYZ (marker_id)) identified by the marker ID is used. Here, the position coordinates (u, v) of the feature point and the position coordinates (X', Y', Z') on the display panel 12A are stored in a list (corners_list(view, plane_id)). However, the plane ID (plane_id) is identified from the ID correspondence table (marker_id_table) using the marker ID. Next, a parameter that represents the distortion of the square detected in S73 is acquired (S75). Specifically, similarly to S72, a homography matrix Hcorner that converts the four vertices of the square that should originally appear as the image of the square into the four vertices of the actual image of the square is acquired.

Next, the square is used as the base point to detect the vertices of the squares around this square (S76). Also in this case, similarly to S73, by converting the four vertices of the square that should originally appear as the image of the square using the homography matrix Hcorner acquired in S75, approximate positions of vertices of the square can be identified taking into account the distortion occurring in the vicinity thereof. Then, by searching for and detecting a feature point (corner) that has been effectively detected around the converted position coordinates, the position coordinates (u, v) and the two-dimensional index are associated with each other (Part C of FIG. 18).

Next, similarly to S74, the two-dimensional indices (i, j) are converted into the corrected position coordinates (X', Y', Z') on the display panel 12A and stored in association with the position coordinates (u, v) of the feature point in the captured image (S77). Also in this case, for the conversion of position coordinates, the corrected conversion table identified by the marker ID is used. Further, the position coordinates (u, v) of the feature point and the position coordinates (X', Y', Z') on the display panel 12A are stored in the list (corners_list(view, plane_id)).

The processing of S75 to S77 is repeated for all squares expressed on the same plane (S78: No). Here, the same plane may be regarded as each display surface (single plane) of the display panel 12A. In the case where correspondence information of vertices of all squares, i.e., feature point, is generated (S78: Yes), the processing of S72 to S78 is repeated for the plane corresponding to another marker detected in S71 (S79:No). When feature point information can be generated for all detected markers and therefore all planes and stored in this way, the processing ends (S79: Yes). When the series of processes in FIG. 17 ends, the processing returns to Step S52 in FIG. 16 and the processing of subsequent Steps is performed. That is, the series of processing in FIG. 17 is repeated for each viewpoint (view) of each camera 11A.

Figure 19:
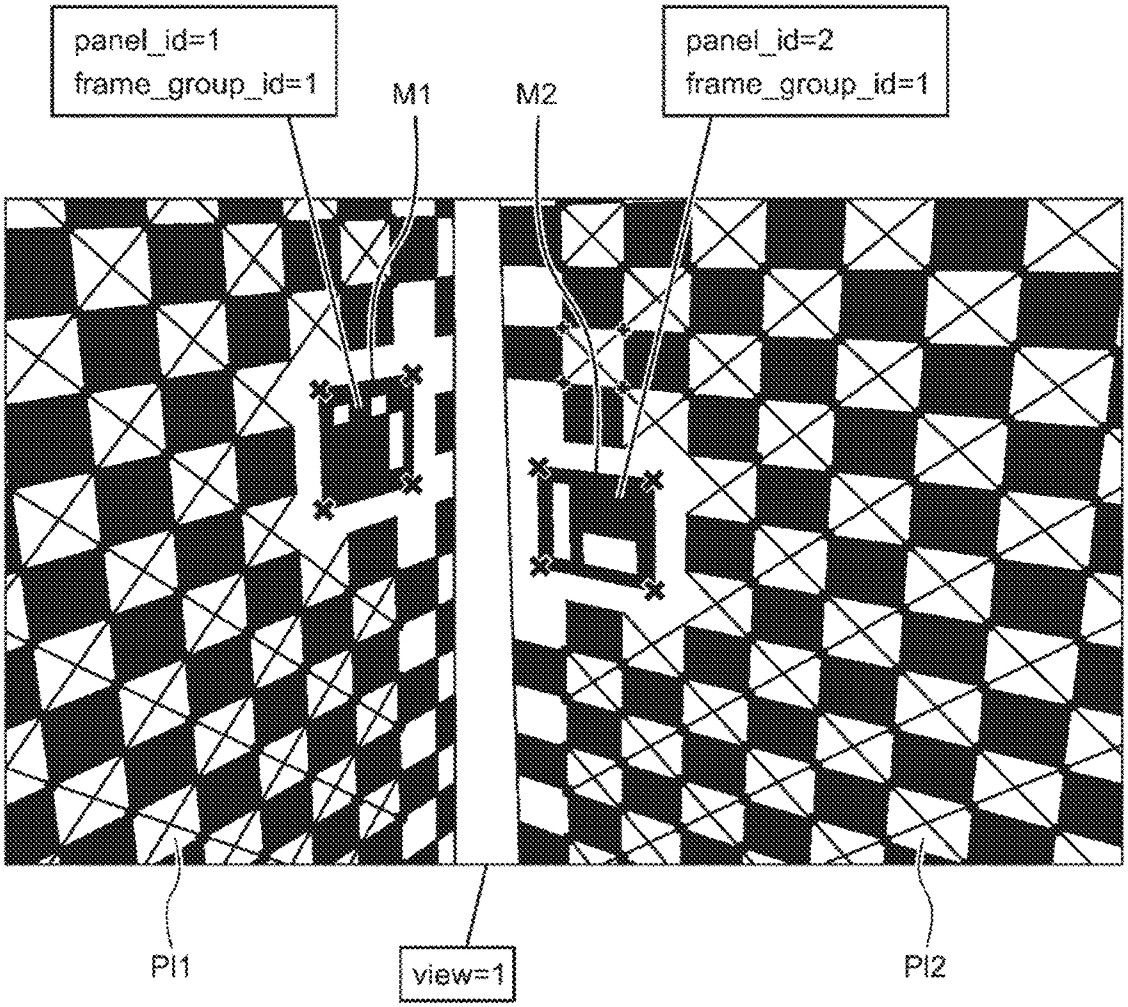
FIG. 19 is a diagram schematically showing a processing result of the feature-point-information generation processing.

As a result, for each viewpoint (view) of each camera 11A, a list (corners_list(view, plane_id)) storing the position coordinates (u, v) corresponding to the feature point (corner) on the same plane and the position coordinates (X', Y', Z') on the display panel 12A is obtained as feature point information. That is, for each feature point, the position coordinates in the captured image and the position coordinates on the display panel 12A are associated with each other. For example, as shown in FIG. 19, when processing on the captured image of view=1 is performed, a marker ID is obtained from each of the images of the markers M1 and M2 in the captured image. At this time, a plane ID is identified from the marker ID with reference to the ID correspondence table. For example, the marker ID (marker_id) embedded in the marker M1 is used as a key to identify panel_id=1 and frame_group_id=1. Further, the marker ID embedded in the marker M2 is used as a key to identify panel_id=2 and frame_group_id=1. Since the values of view and plane_id are specified, the position coordinates (u, v) of the feature point and the position coordinates (X', Y', Z') on the display panel 12A can be stored in the corners_list (view, plane_id).

The details of camera calibration has been described above. In the camera calibration, the chart pattern image displayed on each of the plurality of display panels 12A is imaged by the camera 11A to be calibrated to generate a plurality of captured images. The camera calibration apparatus 22 detects the images of a plurality of chart patterns representing feature point groups whose density differs from the captured images, and generates feature point information that associates the position coordinates of the image of the feature point and the position coordinates of the feature point on the display surface of the display panel 12A with each other. Then, the camera calibration apparatus 22 performs calculation for calibration based on the feature point information and acquires a camera parameter relating to the camera 11A.

<Chart Pattern Calibration>

Calibration of a chart pattern will be described. By performing calibration of a chart pattern, deflection correction data to be used in deflection correction processing is generated.

Figure 20:
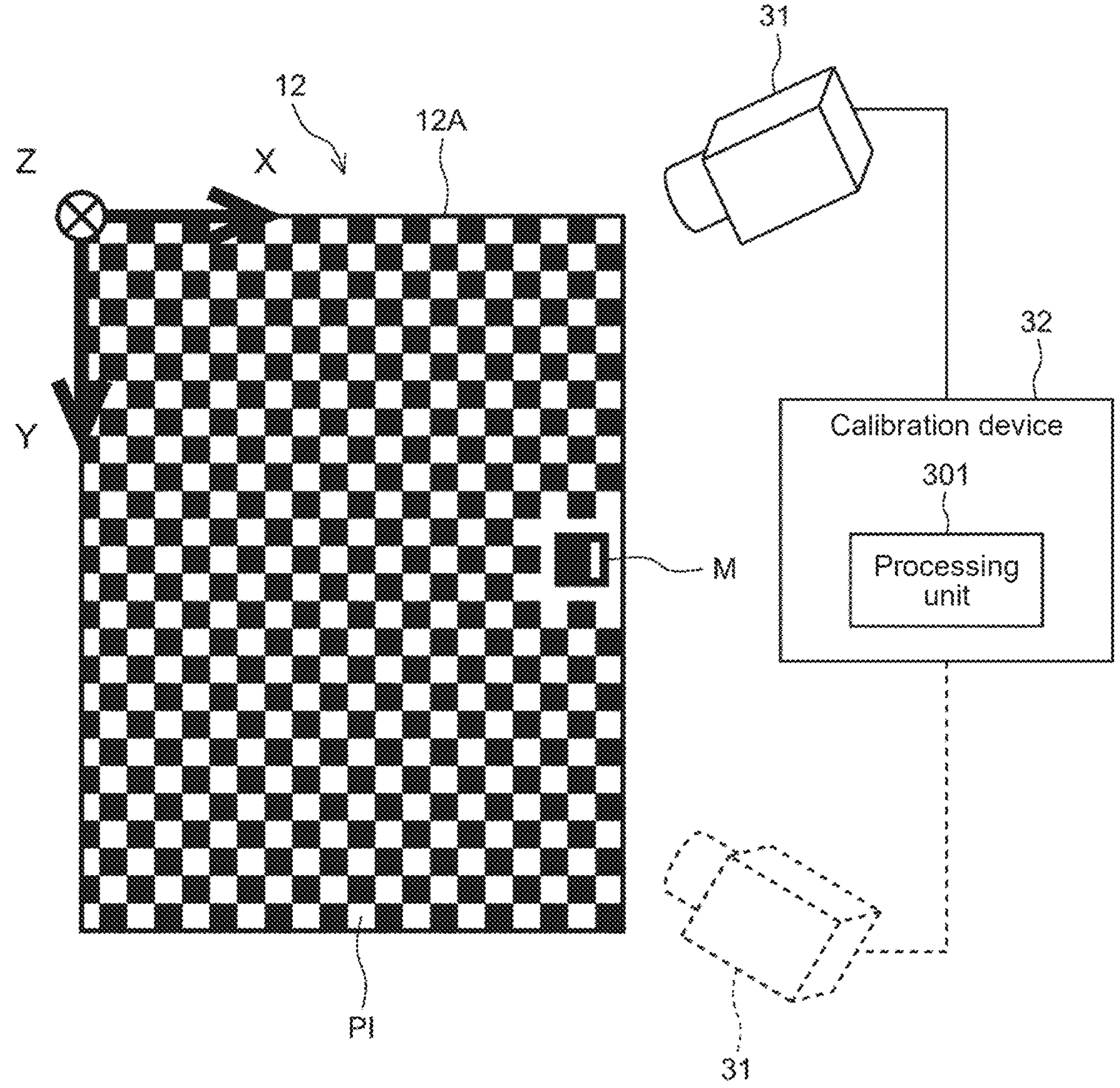
FIG. 20 is a diagram showing a configuration example of the system during chart pattern calibration.

FIG. 20 is a diagram showing a configuration example of a system during calibration of a chart pattern. In FIG. 20, an imaging device 31 images the image of the chart pattern represented by the chart pattern image PI displayed on the display panel 12A of the display device 12 such that the entire display panel 12A is included in the angle of view. At this time, the imaging device 31 images the chart pattern from a plurality of viewpoints while changing the position and attitude as shown by a broken line in the figure. A plurality of captured images taken by the imaging device 31 is output to a calibration device 32 connected via a predetermined interface.

The calibration device 32 includes a PC, a server, a dedicated device, or the like. The calibration device 32 may be the same device as the camera calibration apparatus 22 in FIG. 3 or a device different therefrom. The calibration device 32 includes a processing unit 301. The processing unit 301 performs 3D reconstruction processing using the plurality of captured images taken by the imaging device 31. In this 3D reconstruction processing, for example, the existing technology described in the following literature D can be used. By using the method of the literature D, it is possible to estimate a new group of position coordinates on the display panel 12A taking into account minute deformations on the display surface of the display panel 12A displaying the chart pattern image. This allows the amounts of deformation (ΔX, ΔY, ΔZ) from the ideal state on the plane of the display panel 12A to be obtained.

Literature D: K. H. Strobl and G. Hirzinger, "More Accurate Pinhole Camera Calibration with Imperfect Planar Target". In ICCV Workshops, 2011. 2

Figure 21:
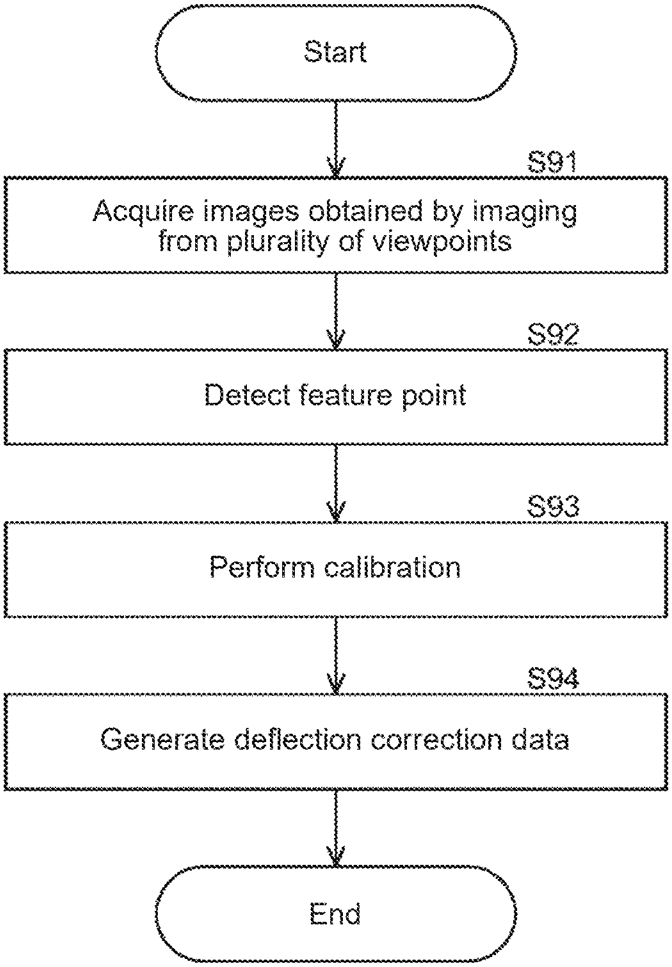
FIG. 21 is a flowchart describing a flow of chart pattern calibration processing.

Now, a flow of chart pattern calibration processing will be described with reference to the flowchart of FIG. 21. In Step S91, the processing unit 301 acquires, for each display panel 12A, a plurality of captured images obtained by imaging the chart pattern image PI. The plurality of captured images is obtained by imaging the chart pattern image PI displayed on the display device 12 by the imaging device 31 while changing the position and attitude. In the case where the display device 12-1 and the display device 12-2 are used during camera calibration, the imaging device 31 takes images from a plurality of viewpoints for each of the display panel 12A-1 and the display panel 12A-2 to obtain a plurality of captured images. The captured image for each display panel 12A can be identified by the panel ID (panel_id).

In Step S92, the processing unit 301 detects the image of the feature point from the captured image. Here, the position coordinates (u, v) of the feature point (corner) can be detected in the same manner as that of the above-mentioned processing by the feature-point-information generation unit 222 (S52 in FIG. 16). The position coordinates (u, v) [pix] in the captured image correspond to the position coordinates ($X_{org}$, $Y_{org}$, $Z_{org}$) on the display panel 12A [mm]. For example, by constraining three points closest to the upper left, lower left, and lower right positions with the upper left position of the four corners of the plane as the origin in the display panel 12A included in the captured image, the feature point (corner) can be estimated.

In Step S93, the processing unit 301 performs calibration using the method of the above literature D. The method of the literature D is also implemented in OpenCV, and a new group of position coordinates on the display panel 12A ($X_{new}$, $Y_{new}$, $Z_{new}$) [mm] can be obtained by inputting the coordinate group of ($X_{org}$, $Y_{org}$, $Z_{org}$) and (u, v) to the API (Application Programming Interface) called cv::calibrateCameraRO( ) in OpenCV4 or subsequent openCV.

In Step S94, the processing unit 301 generates deflection correction data. Here, the difference amounts ($X_{new}-X_{org}$, $Y_{new}-Y_{org}$, $Z_{new}-Z_{org}$) from the original position coordinates on the display panel 12A to the new position coordinates on the display panel 12A are used as the correction amounts (ΔX, ΔY, ΔZ), and the pair of the original position coordinates ($X_{org}$, $Y_{org}$, $Z_{org}$) on the display panel 12A and the correction amounts (ΔX, ΔY, ΔZ) is used as deflection correction data for each display panel 12A (panel_id).

FIG. 22 is a diagram showing an example of the correspondence between the original position coordinates on the display panel 12A and the corrected position coordinates on the display panel 12A. FIG. 23 is a diagram showing an example of correction amounts. The pair of the original position coordinates ($X_{org}$, $Y_{org}$, $Z_{org}$) on the display panel 12A in FIG. 22 and the correction amounts (ΔX, ΔY, ΔZ) in FIG. 23 is used as deflection correction data and recorded on the deflection-correction-data storage unit 202 (FIG. 3). When the processing of Step S94 is completed, the series of processes ends.

The details of chart pattern calibration have been described above. In the chart pattern calibration, deflection correction data to be used in the deflection correction processing (S31 in FIG. 11) is prepared in advance.

<Multi-Scene Imaging>

The imaging device 11 does not necessarily need to image the display device 12 while being fixed at a certain position and attitude (single-scene imaging) and is capable of performing imaging at various positions and attitudes (multi-scene imaging). For example, in the case where sufficient accuracy cannot be achieved with the single-scene imaging, multi-scene imaging may be performed. In the multi-scene imaging, the imaging device 11 takes images a plurality of times while changing the relative position and attitude between the imaging device 11 and the chart pattern image displayed on the display device 12. Here, for example, images are taken while causing the imaging device 11 to be calibrated or the jig fixing the imaging device 11 to be calibrated to move.

Figure 24:
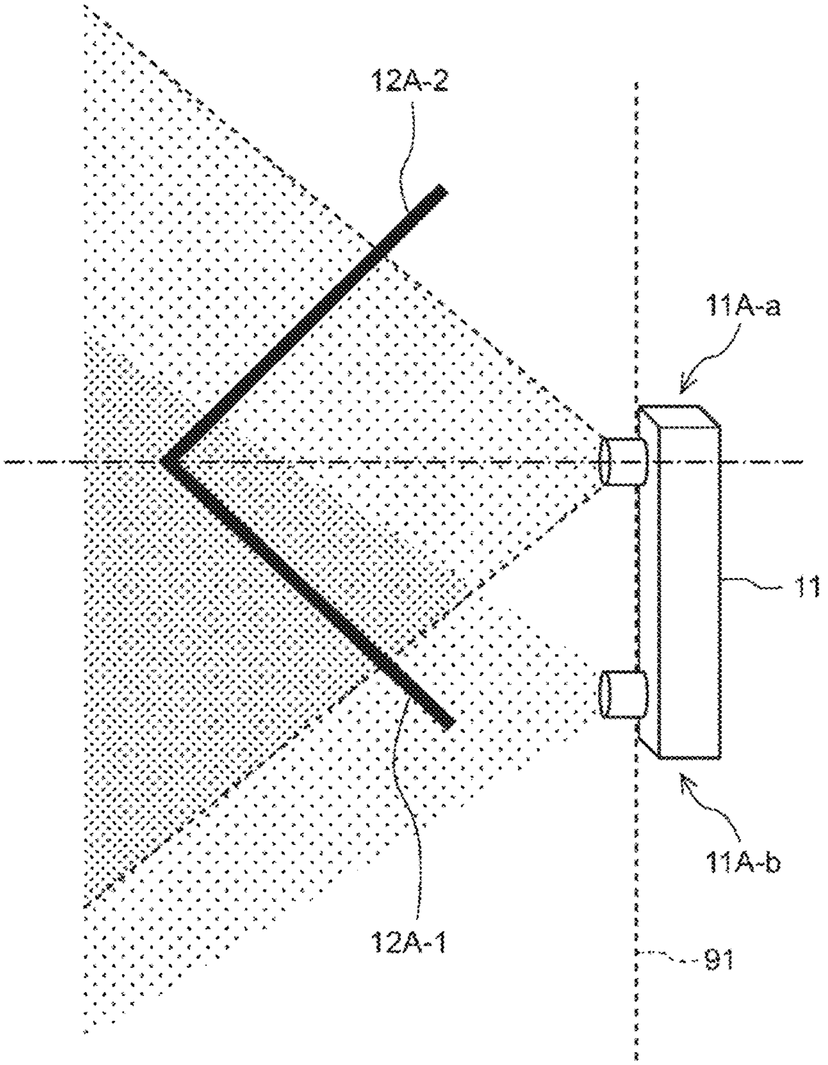
FIG. 24 is a top view showing a first example of multi-scene imaging.
Figure 25:
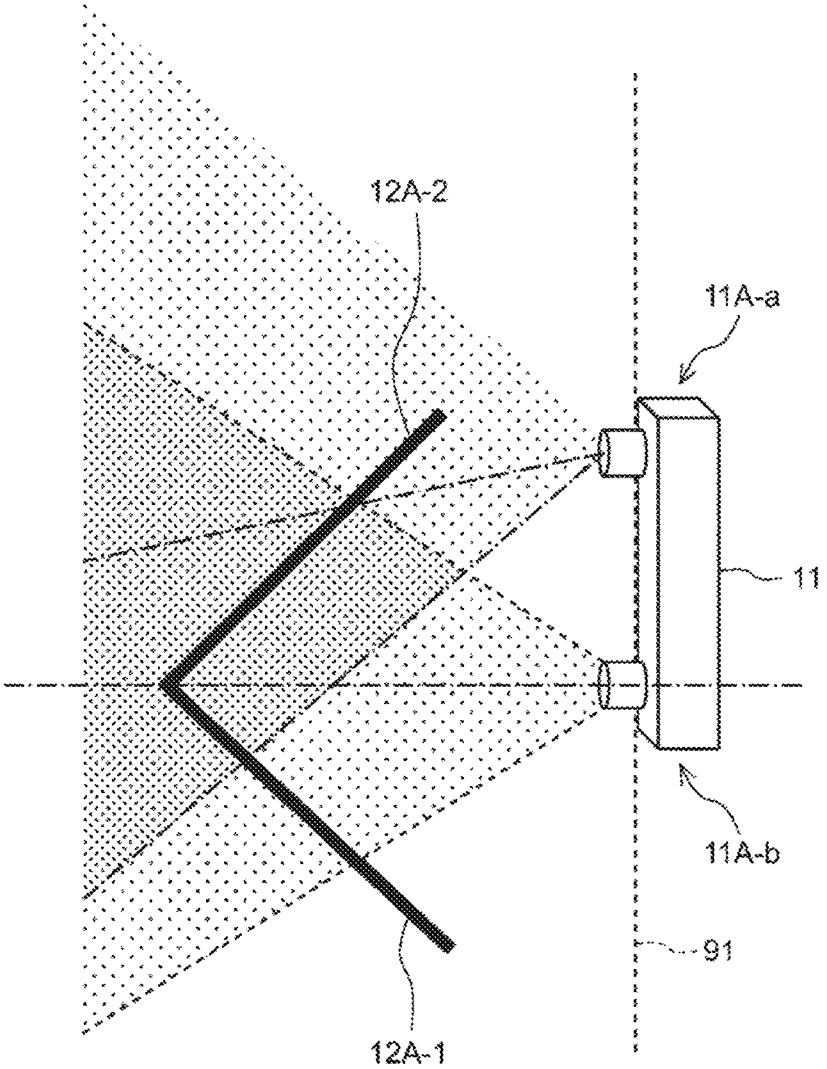
FIG. 25 is a top view showing a second example of the multi-scene imaging.

FIG. 24 and FIG. 25 are each a top view showing an example of multi-scene imaging. In this example, as shown in the display sequence of FIG. 8, a case where the chart pattern images $PI1_0$ to $PI1_4$ are sequentially displayed on the display panel 12A-1 and the chart pattern images $PI2_0$ to $PI2_4$ are sequentially displayed on the display panel 12A-2 at the times t=0 to 4 is assumed. FIG. 24 shows the state of multi-scene imaging at the time t=0. FIG. 25 shows the state of multi-scene imaging at the times t=1 to 4. In this example, the imaging device 11 includes a camera 11A-a that is capable of acquiring captured image with a high resolution (e.g., 1280×1080) and a camera 11A-b that is capable of acquiring a captured image with a low resolution (e.g., 240×180).

As shown in FIG. 24, at the time t=0, the imaging device 11 takes an image at a position and attitude where the chart pattern images PI1 and PI2 fall within the angle of view of the camera 11A-a, of the camera 11A-a and the camera 11A-b. At this time, the chart pattern image $PI1_0$ is displayed on the display panel 12A-1 and the chart pattern image $PI2_0$ is displayed on the display panel 12A-2 (FIG. 8). The chart pattern image $PI1_0$ and the chart pattern image $PI2_0$ each show a chart pattern having relatively high density of the feature point group. The chart pattern images $PI1_0$ and $PI2_0$ may each be regarded as a chart pattern for the high-resolution camera 11A-a. That is, the internal parameter of the camera 11A-a that is a high-resolution camera can be acquired on the basis of the chart pattern images $PI1_0$ and $PI2_0$.

Next, as shown in FIG. 25, at the times t=1 to 4, the imaging device 11 takes an image at a position and attitude where the chart pattern images PI1 and PI2 falls within the angle of view of the camera 11A-b, of the camera 11A-a and the camera 11A-b. Here, for example, the position of the imaging device 11 is changed by movement of the imaging device 11 on a rail 91 indicated by a broken line in the up-and-down direction in the figure. At this time, the chart pattern images $PI1_1$ to $PI1_4$ are sequentially displayed on the display panel 12A-1 and the chart pattern images $PI2_1$ to $PI2_4$ are displayed on the display panel 12A-2 (FIG. 8). Note that since the chart pattern images $PI1_1$ to $PI1_4$ and the chart pattern images $PI2_1$ to $PI2_4$ are each a chart pattern having relatively low density of the feature point group, there is a possibility that as the internal parameter of the camera 11A-b that is a low-resolution camera, sufficient feature point information cannot be acquired with only one image frame (one chart pattern). For this reason, the present disclosure proposes to increase the density and accuracy of the feature point group by integrating feature point groups of a plurality of chart patterns that changes over time.

Further, in FIG. 25, in the case where the chart pattern images PI1 and PI2 falls within the angle of view of the camera 11A-a, the external parameter between the camera 11A-a and the camera 11A-b can be acquired using the captured image acquired by the camera 11A-a and the captured image generated by the camera 11A-b. Here, since the panel ID and the group ID can be identified from the ID correspondence table using the marker ID as a key from the marker M included in the chart pattern images PI1 and PI2, it is possible to identify whether or not the position/attitude relationship between (the camera 11A of) the imaging device 11 and the chart pattern image PI displayed on (the display panel 12A of) the display device 12 is the same. Note that since the camera 11A-a is a high-resolution camera, not only in the case where a chart pattern for a high-resolution camera is imaged but also in the case where a chart pattern for a low-resolution camera is imaged, feature point information with sufficient accuracy can be obtained from the captured image.

At this time, in the ID correspondence table, frame_group_id=0 is associated with marker_id=0, 1 of the chart pattern images $PI1_0$ and $PI2_0$ displayed at the time t=0, and frame_group_id=1 is associated with marker_id=2 to 9 of the chart pattern images $PI1_1$ to $PI1_4$ and $PI2_1$ to $PI2_4$ displayed at the times t=1 to 4. Further, panel_id=1 is associated with marker_id=0, 2, 4, 6, and 8, and panel_id=2 is associated with marker_id=1, 3, 5, 7, and 9. For example, in the feature-point-information generation processing, with reference to the ID correspondence table, in the case where the group ID associated with the marker ID obtained from the maker included in the captured image is the same, feature point information is generated as a feature point group on the same plane. Then, when performing calibration processing, a camera parameter can be acquired by integrating feature point groups on the same plane when their group IDs are the same.

Meanwhile, in the case where the group ID differs, by generating feature point information as a feature point group on another plane, it can be treated as a feature point group on another plane to acquire a camera parameter when performing calibration processing. This allows calibration in multi-scenes in which the position/attitude relationship between (the camera 11A of) the imaging device 11 and the chart pattern image PI displayed on (the display panel 12A of) the display device 12 is changed to be performed with only (the image frames of) the plurality of acquired captured image to be performed. Note that although a case where the imaging device 11 is a multi-camera has been shown in FIG. 24 and FIG. 25, in the case of using a wide-angle camera, the wide-angle camera only needs to take images while moving such that a lens distortion shape of the peripheral portion can be estimated.

As described above, in the calibration system to which the present disclosure is applied, the camera 11A to be calibrated images the chart pattern image including the chart pattern optimized in accordance with the camera 11A to be calibrated displayed on each of the plurality of display panels 12A. Here, the optimized chart pattern displayed on the display panel 12A is a plurality of chart patterns having different density of the feature point group so as to correspond to different sub-pixel accuracy of the plurality of cameras 11A. Then, the camera calibration apparatus 22 detects the image of the feature point of the chart pattern that has changed over time from the captured image acquired by the camera 11A, generates feature point information that associates the position coordinates of the image of the feature point and the position coordinates of the feature point on the display surface of the display panel 12A, and performs calculation for calibration based on the feature point information to acquire a camera parameter relating to the camera 11A.

Further, in the camera calibration in the present disclosure, in order to calibrate the cameras 11A having different resolutions and angles of view, the increase in accuracy and density of feature point information is achieved by integrating feature point groups of the chart pattern that changes over time. As a result, even with a different camera 11A, sufficient feature point information for calibration can be obtained. As a result, even if at least one of the resolution, the angle of view, or the lens distortion shape differs, camera calibration can be suitably performed. For example, in single-scene imaging in which the imaging device 11 is fixed at a position and attitude relative to the display device 12 or a small number of imaging scenes, the imaging device 11 including a plurality of cameras 11A having different parameters can be calibrated with high accuracy. The camera calibration in the present disclosure does not necessarily need to be applied to be applied to a visible light camera and is applicable also to a non-visible light camera. Further, since the chart pattern generation device 21 that performs display control of a chart pattern image and the camera calibration apparatus 22 that acquires a captured image may be separate devices and each independently operate, the system configuration can be further simplified.

Modified Example

Another Configuration Example

Figure 26:
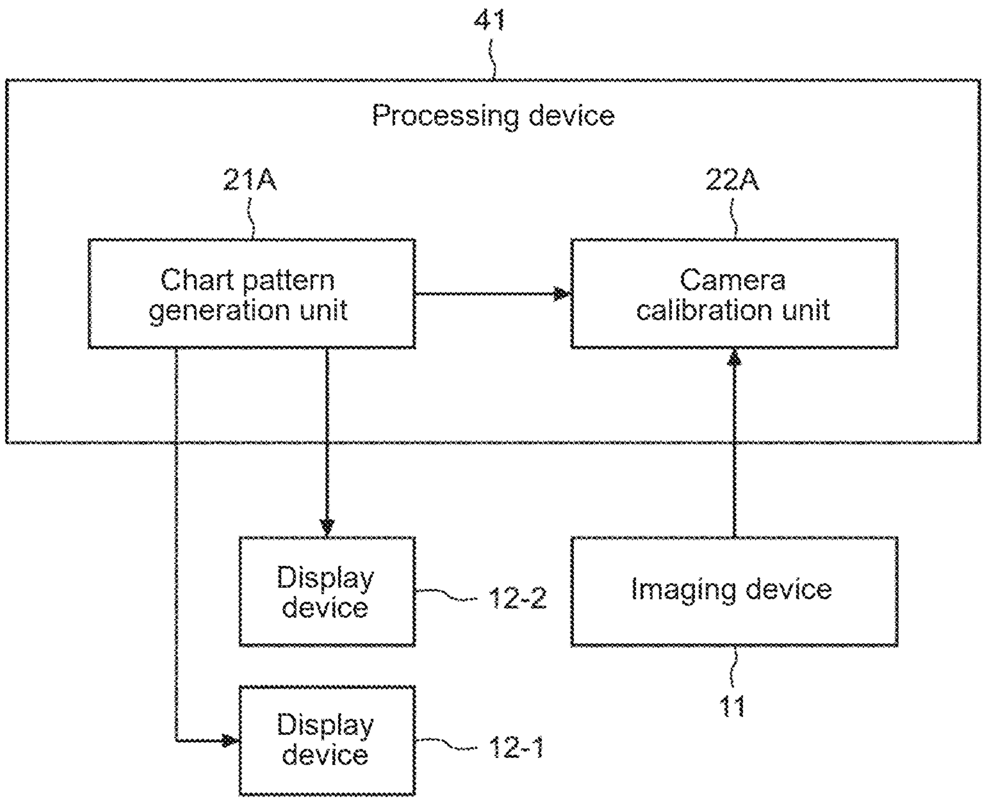
FIG. 26 is a block diagram showing another configuration example of the calibration system to which the present disclosure is applied.

FIG. 26 is a block diagram showing another configuration example of the calibration system to which the present disclosure is applied. In FIG. 26, a calibration system includes the imaging device 11, the display devices 12-1 and 12-2, and a processing device 41. In the calibration system in FIG. 26, the processing device 41 is provided instead of the chart pattern generation device 21 and the camera calibration apparatus 22, as compared with the calibration system in FIG. 3.

The processing device 41 includes a PC, a server, a dedicated device, or the like. The processing device 41 includes a chart pattern generation unit 21A and a camera calibration unit 22A. The chart pattern generation unit 21A has a function similar to that of the chart pattern generation device 21 in FIG. 3. The camera calibration unit 22A has a function similar to that of the camera calibration apparatus 22 in FIG. 3. In this way, the chart pattern generation device 21 and the camera calibration apparatus 22 may be configured as separate devices or may be configured as one device, the processing device 41.

Figure 27:
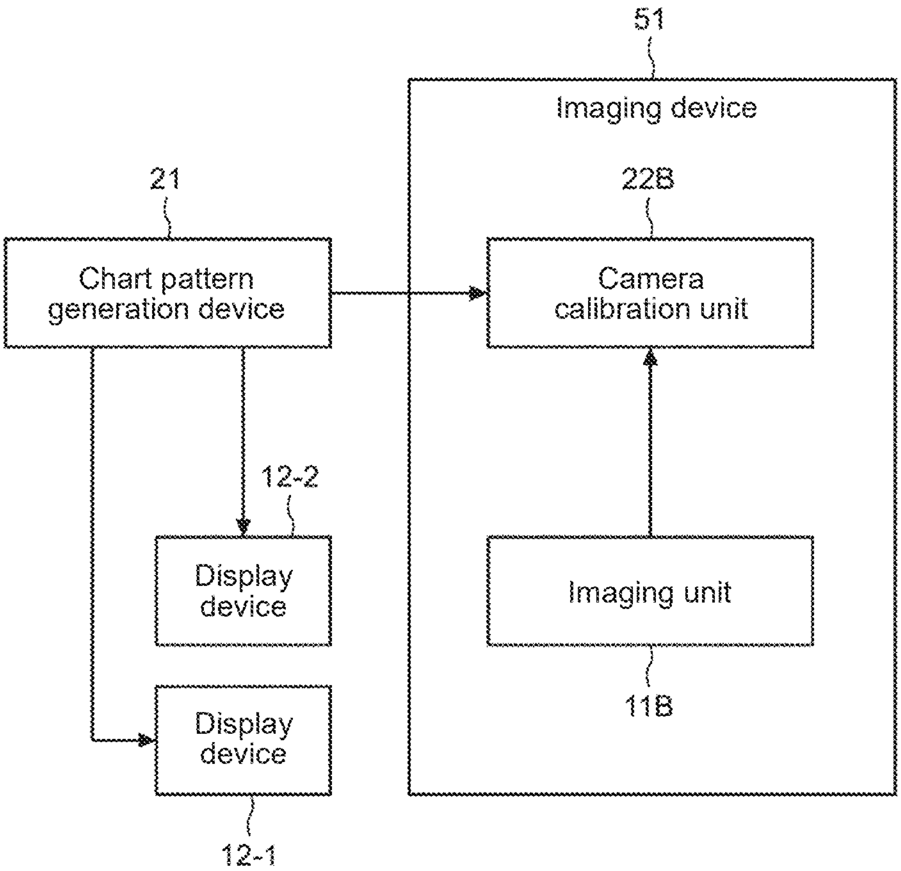
FIG. 27 is a block diagram showing another configuration example of the calibration system to which the present disclosure is applied.

FIG. 27 is a block diagram showing a still another configuration example of the calibration system to which the present disclosure is applied. In FIG. 27, the calibration system includes the display devices 12-1 and 12-2, the chart pattern generation device 21, and an imaging device 51. In the calibration system in FIG. 27, the imaging device 51 is provided instead of the imaging device 11 and the camera calibration apparatus 22, as compared with the calibration system in FIG. 3.

The imaging device 51 includes an imaging unit 11B and a camera calibration unit 22B. The imaging unit 11B has a function similar to that of the imaging device 11 in FIG. 3. The camera calibration unit 22B has a function similar to that of the camera calibration apparatus 22 in FIG. 3. In this way, the calibration processing may be performed on the imaging device side or may be performed by a different device other than the imaging device.

Note that although the above description has shown the configuration in which two display device 12, i.e., the display device 12-1 and the display device 12-2, are provided, three or more display devices 12 may be provided and a chart pattern image may be displayed on the respective display devices 12. Even with such a configuration, the display panel 12A of each display device 12 can be identified by the panel ID.

In the calibration system to which the present disclosure is applied, the chart pattern generation device 21 and the camera calibration apparatus 22 are capable of operating independently without cooperation, but may operate in cooperation. Further, in the case where the display panel 12A that is not affected by deflection (less affected by deflection) is used as the display panel 12A of the display device 12, the deflection correction processing (S31 in FIG. 11) does not necessarily need to be performed. In this case, in the camera parameter estimation unit 205, the conversion table recorded on the table storage unit 201 only needs to be used instead of the corrected conversion table recorded on the table storage unit 204.

<Configuration of Computer>

Figure 28:
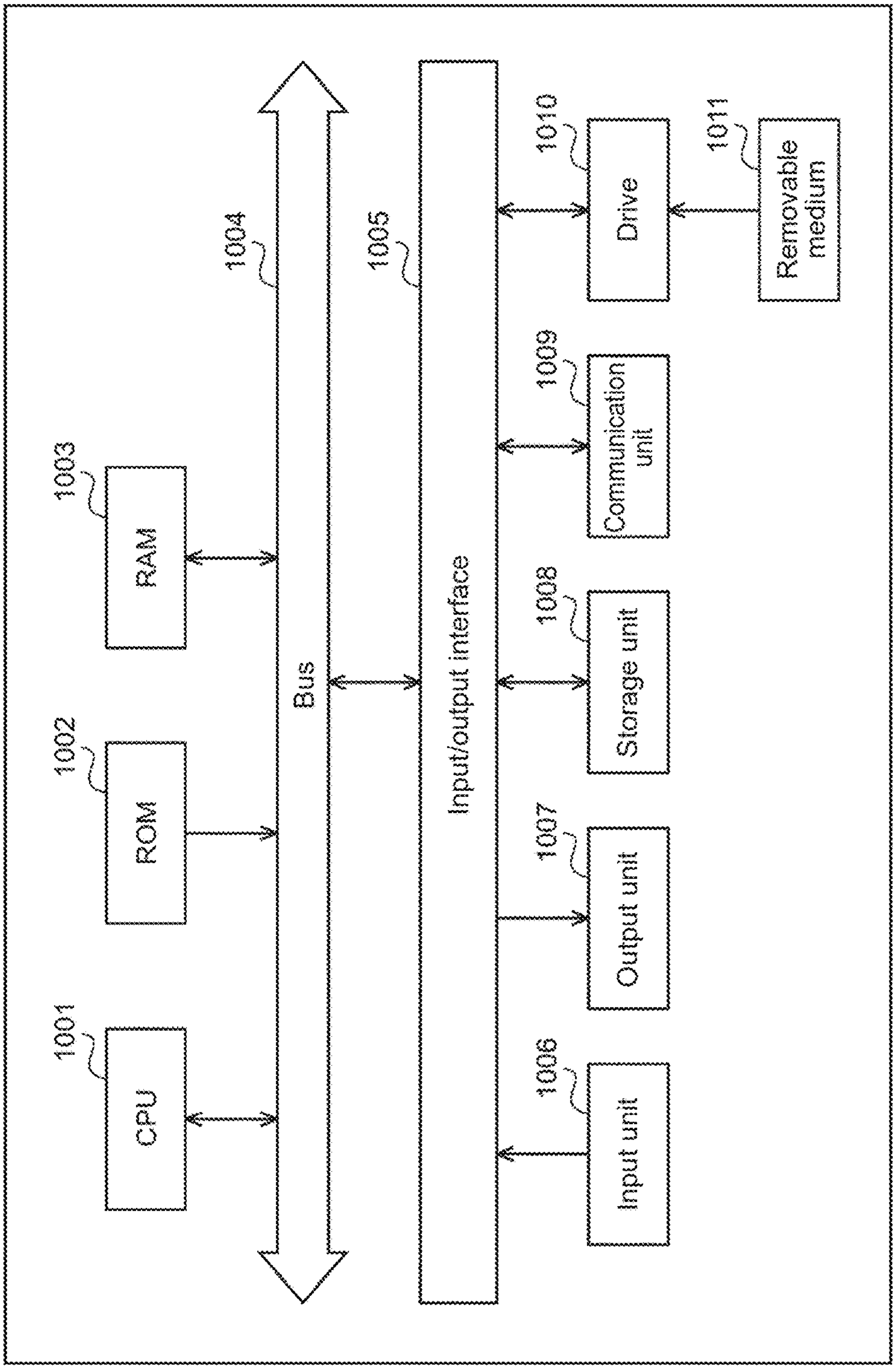
FIG. 28 is a block diagram showing a configuration example of a computer.

The above-mentioned series of processes may be executed by hardware or executed by software. When the series of processes is executed by software, a program constituting the software is installed in a computer. FIG. 28 is a block diagram showing a configuration example of hardware of a computer that executes the above-mentioned series of processes by a program.

In the computer, a CPU 1001, a ROM 1002, and a RAM 1003 are connected to each other via a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives a removable recording medium 1011 such as a semiconductor memory, a magnetic disc, an optical disc, and a magneto-optical disc.

In the computer as described above, the CPU 1001 loads the program recorded on the ROM 1002 or the storage unit 1008 into the RAM 1003 via the input/output interface 1005 and the bus 1004 and executes the program to perform the above-mentioned series of processes.

The program executed by the computer (CPU 1001) can be recorded on the removable recording medium 1011 as a package medium or the like and provided. Further, the program can be provided via a wired or wireless transmission medium such as a local area network, the Internet, and digital satellite broadcasting.

In the computer, the program can be installed in the storage unit 1008 via the input/output interface 1005 by inserting the removable recording medium 1011 into the drive 1010. Further, the program can be received by the communication unit 1009 via a wired or wireless transmission and installed in the storage unit 1008. In addition, the program may be installed in the ROM 1002 or the storage unit 1008 in advance.

Here, in the present specification, the processing performed by the computer in accordance with the program does not necessarily need to be performed in chronological order in the order described as a flowchart. That is, the program performed by the computer in accordance with the program includes processing executed in parallel or individually (e.g., parallel processing or processing by objects).

Further, the program may be processed by one computer (processor) or may be distributed and processed by a plurality of computers.

Note that the embodiment of the present disclosure is not limited to the above-mentioned embodiment and various modifications can be made without departing from the essence of the present disclosure. For example, the calibration system to which the present disclosure is applied can have a configuration of cloud computing in which one function is shared and processed in cooperation by a plurality of devices via a network. Further, the effects described in the present specification are merely examples and not limitative, and other effects may be exhibited.

Further, the present disclosure may take the following configurations.

(1) A camera calibration apparatus, including:

an image acquisition unit that acquires, from a camera, a captured image indicating a chart pattern displayed in a time division manner on a display panel inclined with respect to an optical axis direction of the camera;

a feature-point-information generation unit that generates integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and a parameter acquisition unit that acquires a parameter for calibration of the camera on the basis of the integrated feature point information.

(2) The camera calibration apparatus according to (1) above, further including a conversion information storage unit that records conversion information for converting two-dimensional coordinates of the feature point at the first time into three-dimensional coordinates and two-dimensional coordinates of the feature point at the second time into three-dimensional coordinates, the feature-point-information generation unit identifying the two-dimensional coordinates of the feature point at the first time and the two-dimensional coordinates of the feature point at the second time on the basis of a first marker included in the chart pattern at the first time and a second marker that is included in the chart pattern at the second time and having an ID different from an ID of the first marker, converting, on the basis of the conversion information, the two-dimensional coordinates of the feature point at the first time and the two-dimensional coordinates of the feature point at the second time into the respective three-dimensional coordinates, and generating the integrated feature point information on the basis of the converted three-dimensional coordinates.

(3) The camera calibration apparatus according to (2) above, further including a correspondence information storage unit that records correspondence information for associating a panel ID for identifying the display panel with the ID of the first marker and the ID of the second marker, the feature-point-information generation unit identifies the panel ID on the basis of the correspondence information, the ID of the first marker, and the ID of the second marker, associates the feature point at the first time and the feature point at the second time with a display surface of the display panel identified by the identified panel ID, and integrates the feature point at the first time and the feature point at the second time.

(4) The camera calibration apparatus according to (3) above, in which the display panel includes a first display panel and a second display panel that are inclined with respect to the optical axis direction, the panel ID includes a first panel ID for identifying the first display panel and a second panel ID for identifying the second display panel, and the feature-point-information generation unit associates some feature points at the first time with the first display panel on the basis of the first panel ID indicated by one of a plurality of the chart patterns at the first time, associates remaining feature points at the first time with the second display panel on the basis of the second panel ID indicated by the other of the plurality of chart patterns at the first time, associates some feature points at the second time with the first display panel on the basis of the first panel ID indicated by a plurality of the chart patterns at the second time, associates remaining feature points at the second time with the second display panel on the basis of the second panel ID indicated by the other of the plurality of chart patterns at the second time, and integrates the feature point at the first time and the feature point at the second time for each of a display surface of the first display panel and a display surface of the second display panel.

(5) The camera calibration apparatus according to (3) above, in which the correspondence information associates a first group ID indicating a first position/attitude relationship with each of the ID of the first marker and the ID of the second marker, the first position/attitude relationship indicating a relationship of at least one of a relative position or a relative attitude between the camera and the display panel, and associates a second group ID indicating a second position/attitude relationship with each of the ID of the first marker and the ID of the second marker, the second position/attitude relationship being different from the first position/attitude relationship and indicating a relationship of at least one of a relative position or a relative attitude between the camera and the display panel, and the feature-point-information generation unit identifies one of the first group ID and the second group ID on the basis of the correspondence information, the ID of the first marker, and the ID of the second marker and integrates the feature point at the first time and the feature point at the second time with respect to the display surface of the display panel on the basis of the identified one group ID and the identified panel ID.

(6) The camera calibration apparatus according to any one of (2) to (5) above, further including a correction unit that corrects, on the basis of correction data including a correction amount corresponding to an amount of deformation from an ideal state relating to a display surface of the display panel, position coordinates of a feature point on the display surface of the display panel, the feature-point-information generation unit generating the integrated feature point information on the basis of the correction data and the conversion information.

(7) The camera calibration apparatus according to (2) above, in which the feature-point-information generation unit associates the two-dimensional coordinates of the feature point at the first time and the three-dimensional coordinates with each other as a pair, associates the two-dimensional coordinates of the feature point at the second time and the three-dimensional coordinates with each other as a pair, and integrates the pair of the two-dimensional coordinates of the feature point at the first time and the three-dimensional coordinates and the pair of the two-dimensional coordinates of the feature point at the second time and the three-dimensional coordinates with respect to a display surface of the display panel.

(8) The camera calibration apparatus according to any one of (1) to (7) above, in which the camera includes a relatively low-resolution camera and a relatively high-resolution camera, the chart pattern includes a low-resolution chart pattern and a high-resolution chart pattern, the low-resolution chart pattern including the chart pattern at the first time and the chart pattern at the second time and having relatively low density of a feature point group, the high-resolution chart pattern being of a time different from the first time and the second time and having relatively high density of a feature point group, the feature-point-information generation unit generates the integrated feature point information based on the low-resolution chart pattern acquired from the low-resolution camera and high-resolution feature point information based on the high-resolution chart pattern acquired from the high-resolution camera, and the parameter acquisition unit acquires, on the basis of the integrated feature point information and the high-resolution feature point information, a parameter for calibrating the low-resolution camera and a parameter for calibrating the high-resolution camera.

(9) The camera calibration apparatus according to any one of (1) to (8) above, in which the display panel is electronic paper, the image acquisition unit acquires, from the camera, an infrared light image indicating the chart pattern displayed in a time division manner by the electronic paper, and the feature-point-information generation unit generates the integrated feature point information on the basis of the infrared light image.

(10) A camera calibration method, including:

acquiring, from a camera, a captured image indicating a chart pattern displayed in a time division manner on a display panel inclined with respect to an optical axis direction of the camera;

generating integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquiring a parameter for calibration of the camera on the basis of the integrated feature point information.

(11) A recording medium that records a program including instructions to cause a computer to:

acquire, from a camera, a captured image indicating a chart pattern displayed in a time division manner on a display panel inclined with respect to an optical axis direction of the camera;

generate integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquire a parameter for calibration of the camera on the basis of the integrated feature point information.

REFERENCE SIGNS LIST

11 imaging device
11A-1 to 11A-3, 11A-a, 11A-b, 11A camera
11B imaging unit
12-1, 12-2 display device
12A-1, 12A-2,12A display panel
13-1, 13-2 light source
21 chart pattern generation device
21A chart pattern generation unit
22 camera calibration apparatus
22A, 22B camera calibration unit
31 imaging device
32 calibration device
41 processing device
51 imaging device
101 generation unit
102 display control unit
201 table storage unit
202 deflection-correction-data storage unit
203 deflection correction unit
204 table storage unit
205 camera parameter estimation unit
206 camera parameter storage unit
221 image acquisition unit
222 feature-point-information generation unit
223 camera parameter acquisition unit
301 processing unit
1001 CPU

The invention claimed is:

1. A camera calibration apparatus, comprising:

an image acquisition unit that acquires, from a camera, a captured image indicating a chart pattern displayed in a time division manner on a display panel inclined with respect to an optical axis direction of the camera;

a feature-point-information generation unit that generates integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and a parameter acquisition unit that acquires a parameter for calibration of the camera on a basis of the integrated feature point information.

2. The camera calibration apparatus according to claim 1, further comprising a conversion information storage unit that records conversion information for converting two-dimensional coordinates of the feature point at the first time into three-dimensional coordinates and two-dimensional coordinates of the feature point at the second time into three-dimensional coordinates, the feature-point-information generation unit identifying the two-dimensional coordinates of the feature point at the first time and the two-dimensional coordinates of the feature point at the second time on a basis of a first marker included in the chart pattern at the first time and a second marker that is included in the chart pattern at the second time and having an ID different from an ID of the first marker, converting, on a basis of the conversion information, the two-dimensional coordinates of the feature point at the first time and the two-dimensional coordinates of the feature point at the second time into the respective three-dimensional coordinates, and generating the integrated feature point information on a basis of the converted three-dimensional coordinates.

3. The camera calibration apparatus according to claim 2, further comprising a correspondence information storage unit that records correspondence information for associating a panel ID for identifying the display panel with the ID of the first marker and the ID of the second marker, the feature-point-information generation unit identifies the panel ID on a basis of the correspondence information, the ID of the first marker, and the ID of the second marker, associates the feature point at the first time and the feature point at the second time with a display surface of the display panel identified by the identified panel ID, and integrates the feature point at the first time and the feature point at the second time.

4. The camera calibration apparatus according to claim 3, wherein the display panel includes a first display panel and a second display panel that are inclined with respect to the optical axis direction, the panel ID includes a first panel ID for identifying the first display panel and a second panel ID for identifying the second display panel, and the feature-point-information generation unit associates some feature points at the first time with the first display panel on a basis of the first panel ID indicated by one of a plurality of the chart patterns at the first time, associates remaining feature points at the first time with the second display panel on a basis of the second panel ID indicated by the other of the plurality of chart patterns at the first time, associates some feature points at the second time with the first display panel on a basis of the first panel ID indicated by a plurality of the chart patterns at the second time, associates remaining feature points at the second time with the second display panel on a basis of the second panel ID indicated by the other of the plurality of chart patterns at the second time, and integrates the feature point at the first time and the feature point at the second time for each of a display surface of the first display panel and a display surface of the second display panel.

5. The camera calibration apparatus according to claim 3, wherein the correspondence information associates a first group ID indicating a first position/attitude relationship with each of the ID of the first marker and the ID of the second marker, the first position/attitude relationship indicating a relationship of at least one of a relative position or a relative attitude between the camera and the display panel, and associates a second group ID indicating a second position/attitude relationship with each of the ID of the first marker and the ID of the second marker, the second position/attitude relationship being different from the first position/attitude relationship and indicating a relationship of at least one of a relative position or a relative attitude between the camera and the display panel, and the feature-point-information generation unit identifies one of the first group ID and the second group ID on a basis of the correspondence information, the ID of the first marker, and the ID of the second marker and integrates the feature point at the first time and the feature point at the second time with respect to the display surface of the display panel on a basis of the identified one group ID and the identified panel ID.

6. The camera calibration apparatus according to claim 2, further comprising a correction unit that corrects, on a basis of correction data including a correction amount corresponding to an amount of deformation from an ideal state relating to a display surface of the display panel, position coordinates of a feature point on the display surface of the display panel, the feature-point-information generation unit generating the integrated feature point information on a basis of the correction data and the conversion information.

7. The camera calibration apparatus according to claim 2, wherein the feature-point-information generation unit associates the two-dimensional coordinates of the feature point at the first time and the three-dimensional coordinates with each other as a pair, associates the two-dimensional coordinates of the feature point at the second time and the three-dimensional coordinates with each other as a pair, and integrates the pair of the two-dimensional coordinates of the feature point at the first time and the three-dimensional coordinates and the pair of the two-dimensional coordinates of the feature point at the second time and the three-dimensional coordinates with respect to a display surface of the display panel.

8. The camera calibration apparatus according to claim 1, wherein the camera includes a relatively low-resolution camera and a relatively high-resolution camera, the chart pattern includes a low-resolution chart pattern and a high-resolution chart pattern, the low-resolution chart pattern including the chart pattern at the first time and the chart pattern at the second time and having relatively low density of a feature point group, the high-resolution chart pattern being of a time different from the first time and the second time and having relatively high density of a feature point group, the feature-point-information generation unit generates the integrated feature point information based on the low-resolution chart pattern acquired from the low-resolution camera and high-resolution feature point information based on the high-resolution chart pattern acquired from the high-resolution camera, and the parameter acquisition unit acquires, on a basis of the integrated feature point information and the high-resolution feature point information, a parameter for calibrating the low-resolution camera and a parameter for calibrating the high-resolution camera.

9. The camera calibration apparatus according to claim 1, wherein the display panel is electronic paper, the image acquisition unit acquires, from the camera, an infrared light image indicating the chart pattern displayed in a time division manner by the electronic paper, and the feature-point-information generation unit generates the integrated feature point information on a basis of the infrared light image.

10. A camera calibration method, comprising:

acquiring, from a camera, a captured image indicating a chart pattern displayed in a time division manner on a display panel inclined with respect to an optical axis direction of the camera;

generating integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquiring a parameter for calibration of the camera on a basis of the integrated feature point information.

11. A non-transitory recording medium that records a program including instructions to cause a computer to: acquire, from a camera, a captured image indicating a chart pattern displayed in a time division manner on a display panel inclined with respect to an optical axis direction of the camera; generate integrated feature point information by integrating a feature point at a first time of a chart pattern at the first time and a feature point at a second time of a chart pattern at the second time on a single plane, the chart pattern at the first time being included in an image frame at the first time of the captured image, the chart pattern at the second time being included in an image frame at the second time of the captured image and having arrangement of a feature point group different from that of the chart pattern at the first time; and acquire a parameter for calibration of the camera on a basis of the integrated feature point information.

* * * * *